United States Patent
Yoo et al.

(10) Patent No.: US 10,079,116 B2
(45) Date of Patent: Sep. 18, 2018

(54) ALUMINUM-ION CAPACITOR AND USES THEREOF

(71) Applicant: KOREA INSTITUTE OF ENERGY RESEARCH, Daejeon (KR)

(72) Inventors: Jung-joon Yoo, Daejeon (KR); Chan-woo Lee, Seoul (KR); Yong-il Kim, Daejeon (KR); Hae Soo Lee, Seoul (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 17 days.

(21) Appl. No.: 15/227,002

(22) Filed: Aug. 3, 2016

(65) Prior Publication Data
US 2017/0338052 A1    Nov. 23, 2017

(30) Foreign Application Priority Data
May 20, 2016    (KR) .................. 10-2016-0062344

(51) Int. Cl.
*H01G 11/06*    (2013.01)
*H01G 11/28*    (2013.01)
(Continued)

(52) U.S. Cl.
CPC ............ *H01G 11/06* (2013.01); *H01G 11/28* (2013.01); *H01G 11/30* (2013.01); *H01G 11/32* (2013.01);
(Continued)

(58) Field of Classification Search
CPC ........ H01G 11/06; H01G 11/28; H01G 11/30; H01G 11/32; H01G 11/52; H01G 11/62; H01G 11/72
(Continued)

(56) References Cited

U.S. PATENT DOCUMENTS

| 6,855,273 B2 | 2/2005 | Ravet et al. | |
| 2012/0082905 A1* | 4/2012 | Brown | H01M 4/463 |
| | | | 429/338 |
| 2013/0100581 A1* | 4/2013 | Jung | H01G 11/28 |
| | | | 361/502 |

FOREIGN PATENT DOCUMENTS

| JP | 4190207 B | 12/2008 |
| JP | 2014-207453 A | 10/2014 |

(Continued)

OTHER PUBLICATIONS

M. Lin, et al., 'An ultafast rechargeable aluminium-ion battery,' Nature vol. 520, 324-328(Apr. 16, 2015).
(Continued)

*Primary Examiner* — Michael P McFadden
(74) *Attorney, Agent, or Firm* — Sughrue Mion, PLLC

(57) ABSTRACT

Disclosed is an aluminum ion capacitor, including a separator, an anode and a cathode, between which the separator is interposed, and an electrolyte contacting the anode and the cathode, wherein the anode contains aluminum, the electrolyte contains aluminum ions, and an electrical double layer is formed at the cathode and intercalation and deintercalation of aluminum ions are performed at the anode. Accordingly, a supercapacitor having increased energy density can be effectively manufactured at lower cost than lithium ion capacitors, and also, the supercapacitor has high material stability and thus is not limited as to electrode configuration, and an electrode configuration that has a low manufacturing cost and is able to increase energy density and power density can be adopted.

11 Claims, 38 Drawing Sheets

(51) Int. Cl.
*H01G 11/30* (2013.01)
*H01G 11/32* (2013.01)
*H01G 11/52* (2013.01)
*H01G 11/62* (2013.01)
*H01G 11/72* (2013.01)

(52) U.S. Cl.
CPC ............ *H01G 11/52* (2013.01); *H01G 11/62* (2013.01); *H01G 11/72* (2013.01)

(58) Field of Classification Search
USPC ........................................................ 361/502
See application file for complete search history.

(56) References Cited

FOREIGN PATENT DOCUMENTS

| | | | |
|---|---|---|---|
| JP | 2015-201483 | A | 11/2015 |
| KR | 10-1137723 | B1 | 4/2012 |

OTHER PUBLICATIONS

L.D. Reed and E. Menke, 'The Roles of V2O5 and Stainles Steel in Rechargeable Al-Ion Batteries,' Journal of the Electrochemical Society, 160 (6) A915-A917 (2013) (Apr. 11, 2013).

\* cited by examiner

ALUMINUM-ION CAPACITOR AND USES THEREOF

CROSS-REFERENCE TO RELATED APPLICATION

This application claims the priority benefit of Korean Patent Application No. 10-2016-0062344, filed on May 20, 2016 in the Korean Intellectual Property Office, the disclosure of which is incorporated herein by reference.

BACKGROUND OF THE INVENTION

1. Technical Field

The present invention relates to a supercapacitor and, more particularly, to a supercapacitor having increased energy density through aluminum ions and to the use thereof.

2. Description of the Related Art

Typically, a supercapacitor is referred to as an electrical double-layer capacitor (EDLC) or an ultra-capacitor, and is an energy storage device using a charge phenomenon through a surface chemical reaction or through simple ion transport and adsorption to the electrode and electrolyte interfaces, unlike batteries, which use chemical reactions.

Specifically, a supercapacitor is configured to include electrodes attached to current conductors and an electrolyte solution incorporated thereto, and a pair of charge layers (an electrical double layer) having different signs on electrode interfaces. Such a supercapacitor enables rapid charge and discharge, exhibits high charge and discharge efficiency, and obviates a maintenance due to very low degradation even upon repetition of charge-discharge cycles, thereby resulting in a semi-permanent cycle life. Hence, a supercapacitor is receiving attention as a next-generation energy storage device useful as a replacement for batteries or supplementary batteries.

Such a supercapacitor is advantageous because of rapid charge and discharge, longer cycle life than that of secondary batteries, and a wide operating temperature range. However, it suffers from very low energy density compared to secondary batteries. With the goal of solving this problem, a supercapacitor is provided in various forms, and techniques for increasing energy density by performing both intercalation and deintercalation of lithium ions at either electrode have recently been developed. However, such a supercapacitor, called a lithium ion capacitor, is low in price competitiveness because lithium is expensive and it is difficult to form the electrode that enables the intercalation and deintercalation of lithium ions, thus making it difficult to achieve actual application thereof. In a similar form, a lead oxide capacitor has been developed using lead oxide, the price of which is lower than that of lithium, but its actual application is also difficult, owing to the use of lead, which is a poisonous material.

SUMMARY OF THE INVENTION

Accordingly, the present invention has been made keeping in mind the problems encountered in the related art, and the present invention is intended to provide a supercapacitor using aluminum ions, which are relatively inexpensive and entail no environmental problems.

The present invention provides an aluminum ion capacitor comprising a separator, an anode and a cathode, between which the separator is interposed, and an electrolyte, which contacts the anode and the cathode, wherein the anode is formed of a material including aluminum, the electrolyte includes aluminum ions, and an electrical double layer is formed at the cathode and intercalation and deintercalation of aluminum ions are performed at the anode.

The anode is preferably aluminum foil. Since aluminum is chemical stable, the aluminum ion capacitor of the present invention is able to use the aluminum foil as the anode, thus making it easy to manufacture an anode, unlike conventional lithium ion capacitors. Furthermore, although a conventional lithium ion capacitor is limited in the extent to which the energy density can be increased due to the use of lithium doped carbon, the aluminum ion capacitor of the present invention uses aluminum foil as the anode, thus overcoming the above limitation.

The anode may be any one selected from among aluminum foam, an aluminum powder, and shell particles having an aluminum coating layer. As described above, aluminum is chemically stable, and thus an anode made of an aluminum material may be provided in various forms, such as aluminum foam, an aluminum powder, and a shell having an aluminum coating layer, as necessary. Also, the material including aluminum may be aluminum alone or an aluminum alloy comprising aluminum and copper, magnesium, manganese, silicon, titanium, or zinc.

The cathode preferably includes, as an active material, porous carbon, having a large surface area, and examples of the porous carbon may include activated carbon, carbon nanotubes, and graphene. Furthermore, the cathode may be formed including any active material selected from among an oxide, a sulfide, a nitride, and a conductive polymer.

The anode or the cathode may be configured to include a current collector attached thereto, and the current collector may be a base for forming the anode or the cathode. The current collector may be composed of a material having high conductivity, including a carbonaceous material, such as graphite, etc., and various metal materials. Examples of the metal material may include gold, nickel, aluminum, titanium, stainless steel, chromium, and copper.

The electrolyte including aluminum ions may include an ionic liquid electrolyte and an organic electrolyte or an aqueous electrolyte. The ionic liquid electrolyte may result from dissolving an aluminum salt such as $AlCl_3$ in an ionic liquid, for example, dissolving $AlCl_3$ in an ionic liquid such as [EMIM]Cl (1-Ethyl-3-methylimidazolium chloride). Examples of the electrolyte including aluminum ions may include alkyl imidazolium aluminates, alkyl pyridinium aluminates, alkyl fluoropyrazolium aluminates, alkyl triazolium aluminates, aralkyl ammonium aluminates, dialkyl piperidinium aluminates, alkyl alkoxyammonium aluminates, aralkyl phosphonium aluminates, aralkyl sulfonium aluminates, and ethylmethyl imidazolium tetrachloroaluminate. The organic electrolyte may be obtained by dissolving an aluminum salt such as $AlCl_3$ or $Al(NO_3)_3$ in an organic solvent, such as propylene carbonate, acetonitrile, ethylene carbonate, dimethylcarbonate, ethyl methyl carbonate, diethyl carbonate, methyl tert-butyl ether, or propylene glycol. The aqueous electrolyte may be provided in the form of an aqueous solution of $AlCl_3$ or $Al(NO_3)_3$. Furthermore, not only a liquid electrolyte but also a solid electrolyte may be applied.

In addition, the present invention provides an aluminum ion capacitor comprising a separator, an anode and a cathode, between which the separator is interposed, and an electrolyte, which contacts the anode and the cathode, wherein the electrolyte includes aluminum ions, the anode is formed of a material that enables intercalation and deintercalation of aluminum ions, and an electrical double layer is formed at the cathode and intercalation and deintercalation of aluminum ions are performed at the anode.

In the present invention, electrical energy is stored by the formation of the electrical double layer at the cathode and the intercalation and deintercalation of aluminum ions at the anode, and the anode may be formed of any material by which the intercalation and deintercalation of aluminum ions may be carried out. For example, crystalline carbon, such as graphite or aluminum-doped graphite, may be used to form an anode that enables the intercalation and deintercalation of aluminum ions. Also, an anode that enables the intercalation and deintercalation of aluminum ions may be formed using, as the insertion compound, carbon and silicon, an oxide such as titanium oxide, or a sulfide such as molybdenum sulfide.

In addition, the present invention provides an energy storage system comprising an energy storage source for storing electrical energy supplied from the outside and a controller for controlling the charge and discharge of the energy storage source, wherein the energy storage source includes at least one unit cell, which is composed of the aluminum ion capacitor having the above structure.

In order to efficiently use electrical energy, an energy storage system (ESS) having a controller that functions to store surplus power before use, as necessary, may be mounted for each region, building or enterprise. When the aforementioned aluminum ion capacitor is used as the energy storage source of the energy storage system, it may exhibit a long cycle life compared to secondary batteries and high energy density compared to conventional supercapacitors.

In addition, the present invention provides an ultra-compact supplementary battery having at least one unit cell, which is composed of the aluminum ion capacitor having the above structure.

As the use of various portable electronic devices is increased, the demand for a supplementary battery for charging portable electronic devices during outdoor activities is increasing. In order to increase portability, the size of devices is required to decrease. The aluminum ion capacitor having the above structure may be utilized for an ultra-compact supplementary battery because of the long cycle life and sufficiently high energy density thereof.

Compared to a lithium ion capacitor, the supercapacitor of the invention having sufficiently high energy density may be manufactured at low cost.

Also, compared to a conventional lithium ion capacitor, the supercapacitor of the invention has high material stability, and thus has no limitations on electrode configuration, and thus an electrode configuration that has a low manufacturing cost and is able to increase energy density and power density may be freely adopted.

DESCRIPTION OF SPECIFIC EMBODIMENTS

Hereinafter, a detailed description will be given of embodiments of the present invention with reference to the appended drawings.

EXAMPLE 1

Figure 1:
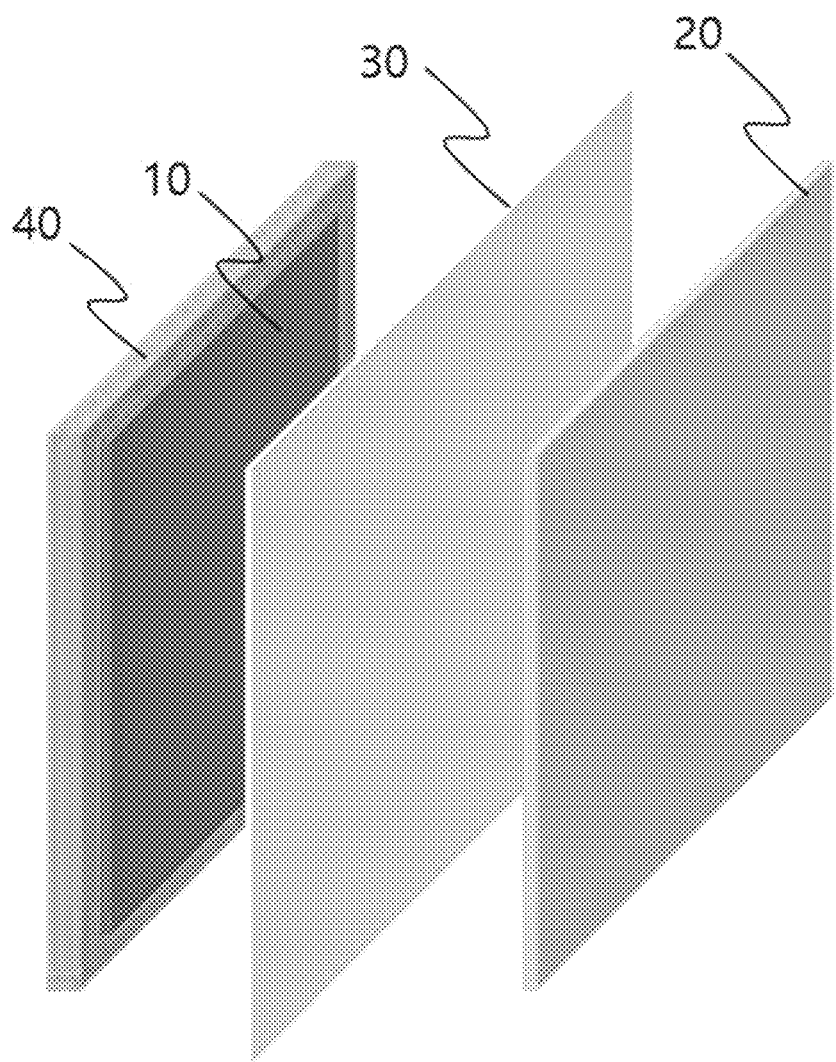
FIG. 1 schematically shows the structure of an aluminum ion capacitor of Example 1 according to the present invention.

FIG. 1 schematically shows the structure of an aluminum ion capacitor of Example 1 according to the present invention.

The aluminum ion capacitor of Example 1 includes a cathode 10 applied on a current collector 40, an anode 20 disposed to face the cathode, and a separator 30 interposed between the cathode 10 and the anode 20, the capacitor being filled with an electrolyte (not shown).

The aluminum ion capacitor of Example 1 adopts a glass fiber separator as the separator 30, and is manufactured by applying the cathode 10 including activated carbon on the current collector 40, which is made of gold (Au). The anode 20 is aluminum foil, and has no additional current collector.

Specifically, a slurry, comprising 85 wt % of activated carbon (hereinafter, referred to as "YP50FH activated carbon"), obtained by thermally treating YP50F activated carbon, available from Kuraray, at 900° C. for 2 hr, 7 wt % of super-P, 3 wt % of carboxymethyl cellulose (CMC), and 7 wt % of styrene-butadiene rubber (SBR), is applied on a current collector 40 made of Au, thus forming an cathode 10. The area of the applied cathode is 2.54 cm$^2$.

Activated carbon, which is a porous carbon material, is a cathode active material, and super-P functions as a conductive material. Carboxymethyl cellulose and styrene-butadiene rubber, which are water-soluble polymer material, are used as an aqueous binder to fix the active material and the conductive material.

Used as the anode 20, the aluminum foil has a thickness of 110 μm, and is surface-treated with 0.1 M NaOH to remove oxides and impurities from the surface thereof. A conventional supercapacitor using lithium ions is problematic because lithium foil itself cannot be used as the anode due to the stability problems of lithium, but aluminum is stable, and thus the aluminum ion capacitor of Example 1 may include the aluminum foil serving as the anode, thus facilitating the fabrication thereof. As such, the anode made of aluminum may be provided in various forms, as necessary.

The electrolyte, with which the cathode 10 and the anode 20 are filled, is used by dissolving AlCl$_3$ in an ionic liquid such as [EMIM]Cl (1-Ethyl-3-methylimidazolium chloride). Such an electrolyte includes aluminum ions dispersed therein, and intercalation and deintercalation of aluminum ions are performed at the anode 20, which is made of aluminum, and the electrical double layer is formed by electrons contained in the electrolyte at the cathode 10, thus storing electrical energy.

The electrochemical properties of the aluminum ion capacitor of Example 1 thus configured were measured.

Figure 2:
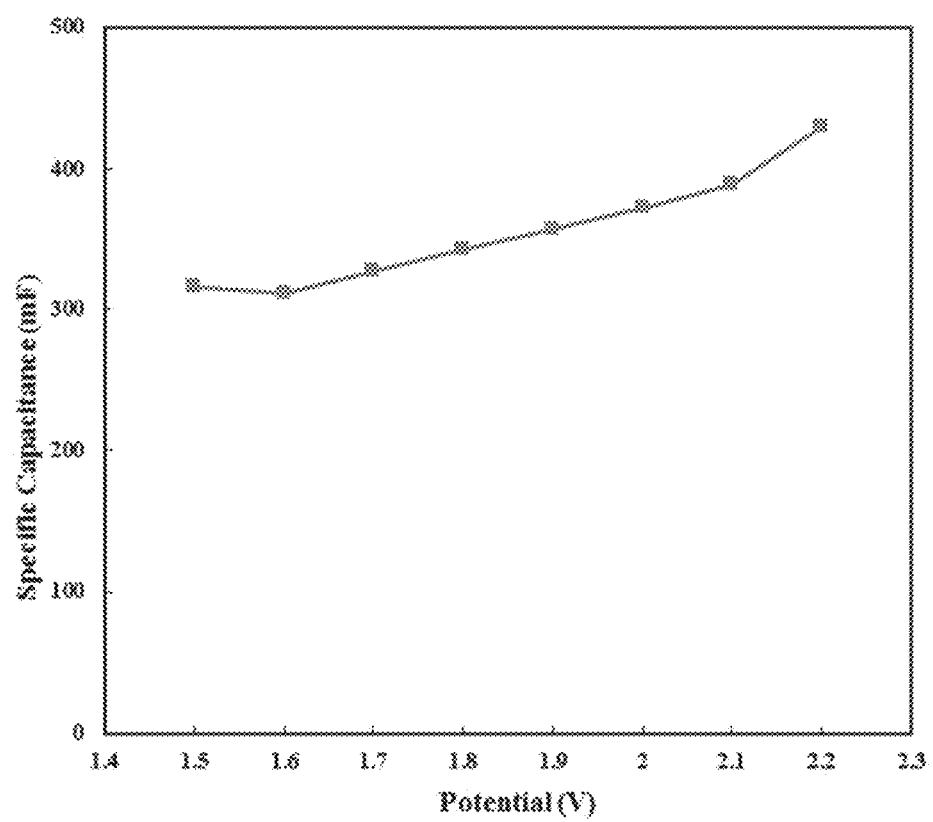
FIG. 2 shows the results of measurement of specific capacitance depending on the potential window in the aluminum ion capacitor of Example 1.

FIG. 2 shows the results of measurement of specific capacitance depending on the potential window in the aluminum ion capacitor of Example 1.

The specific capacitance of the aluminum ion capacitor was measured depending on changes in the potential, and the scan rate was 10 mV/S. The aluminum ion capacitor of Example 1 exhibited a specific capacitance of 300 mF or more at 1.5 V. The specific capacitance was gradually increased with an increase in potential, and thus reached at least 400 mF at 2.2 V.

Figure 3:
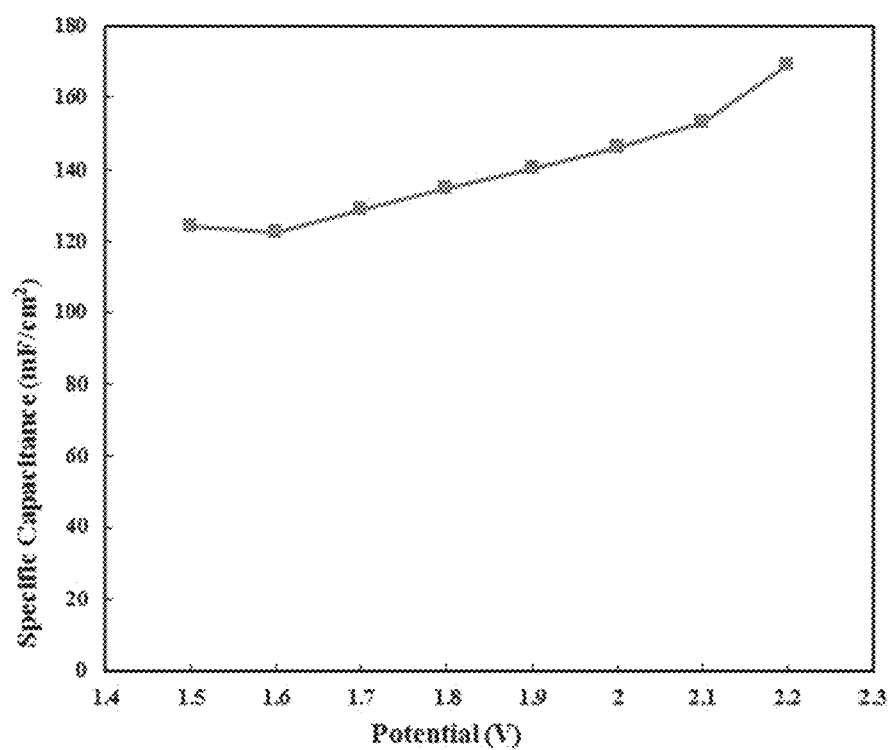
FIG. 3 shows the results of calculation of specific capacitance per area based on the results of specific capacitance of FIG. 2.

FIG. 3 shows the results of calculation of specific capacitance per area based on the results of specific capacitance of FIG. 2.

As mentioned above, the area of the cathode applied on the current collector was 2.54 cm$^2$, and the aluminum ion capacitor of Example 1 exhibited superior results of 120 mF or more per unit area (1 cm$^2$).

Figure 4:
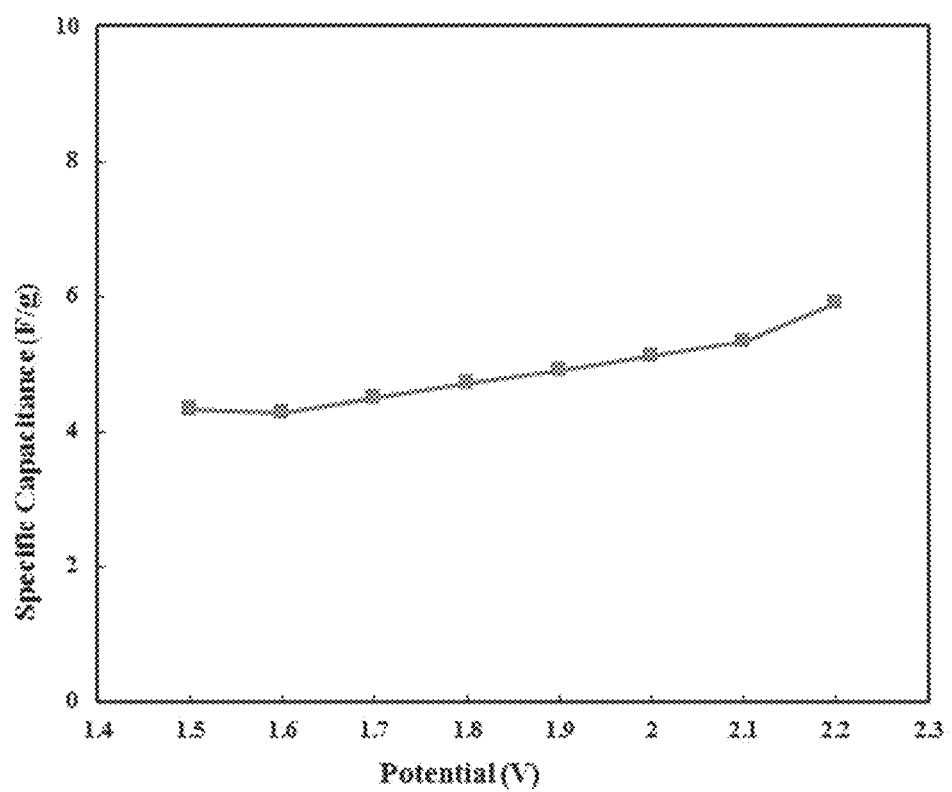
FIG. 4 shows the results of calculation of specific capacitance per total electrode weight based on the results of specific capacitance of FIG. 2.
Figure 5:
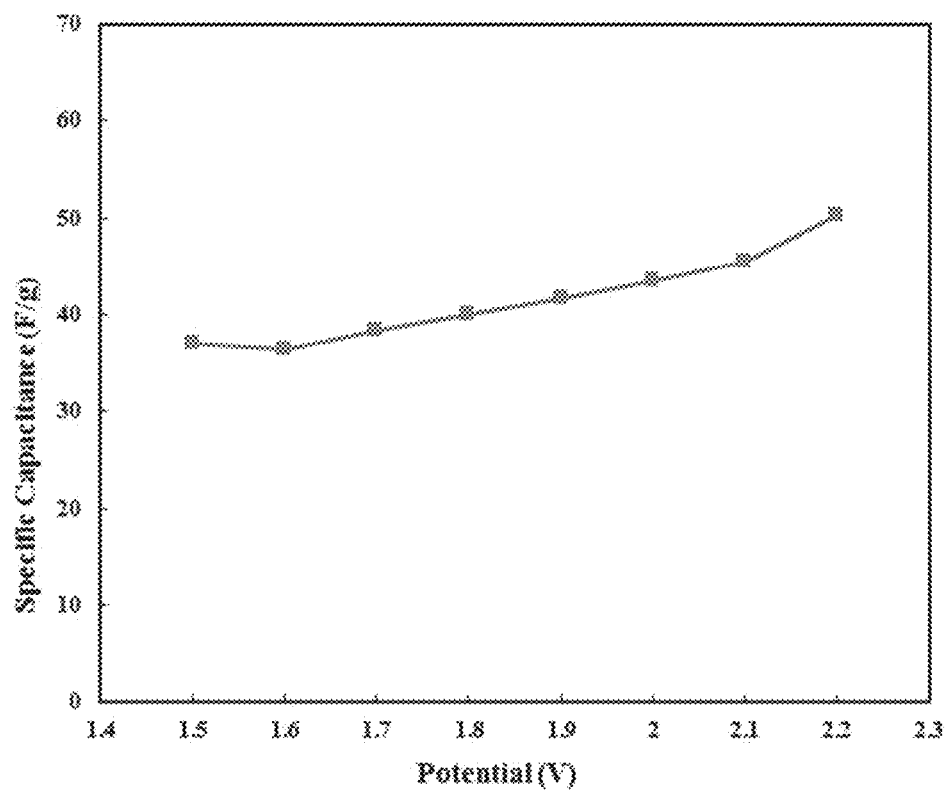
FIG. 5 shows the results of calculation of specific capacitance per weight of the cathode based on the results of specific capacitance of FIG. 2.

FIG. 4 shows the results of calculation of specific capacitance per total electrode weight based on the results of specific capacitance of FIG. 2, and FIG. 5 shows the results of calculation of specific capacitance per weight of the cathode.

Figure 6:
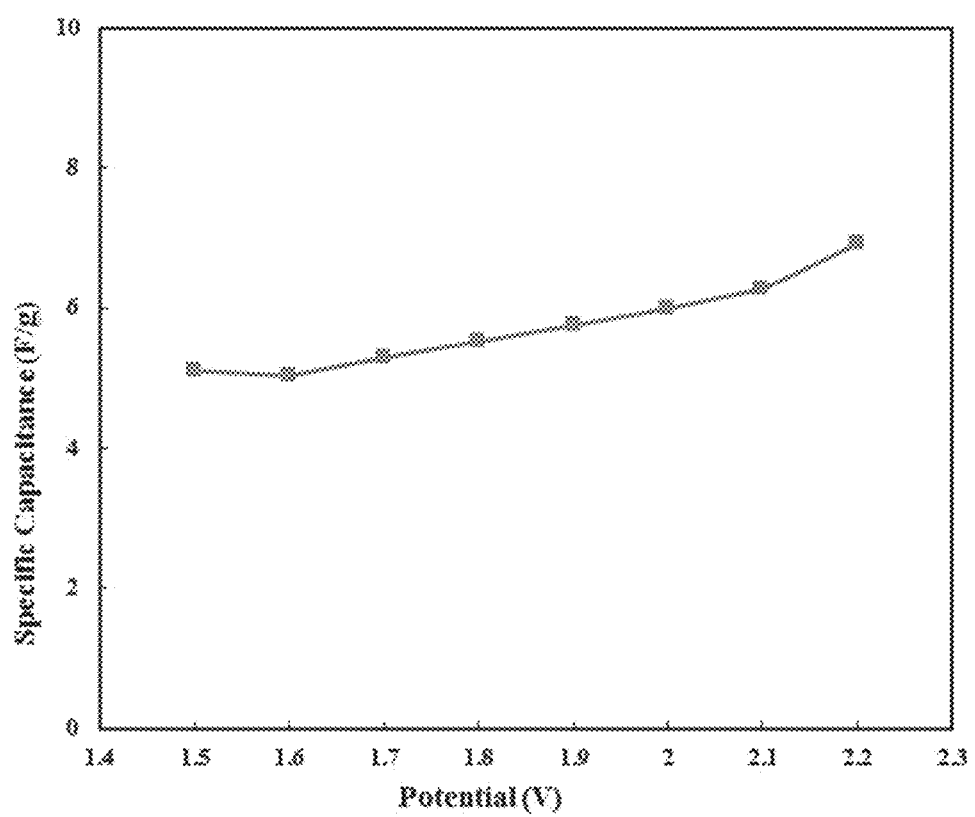
FIG. 6 shows the results of calculation of specific capacitance per weight of the cathode active material based on the results of FIG. 4.
Figure 7:
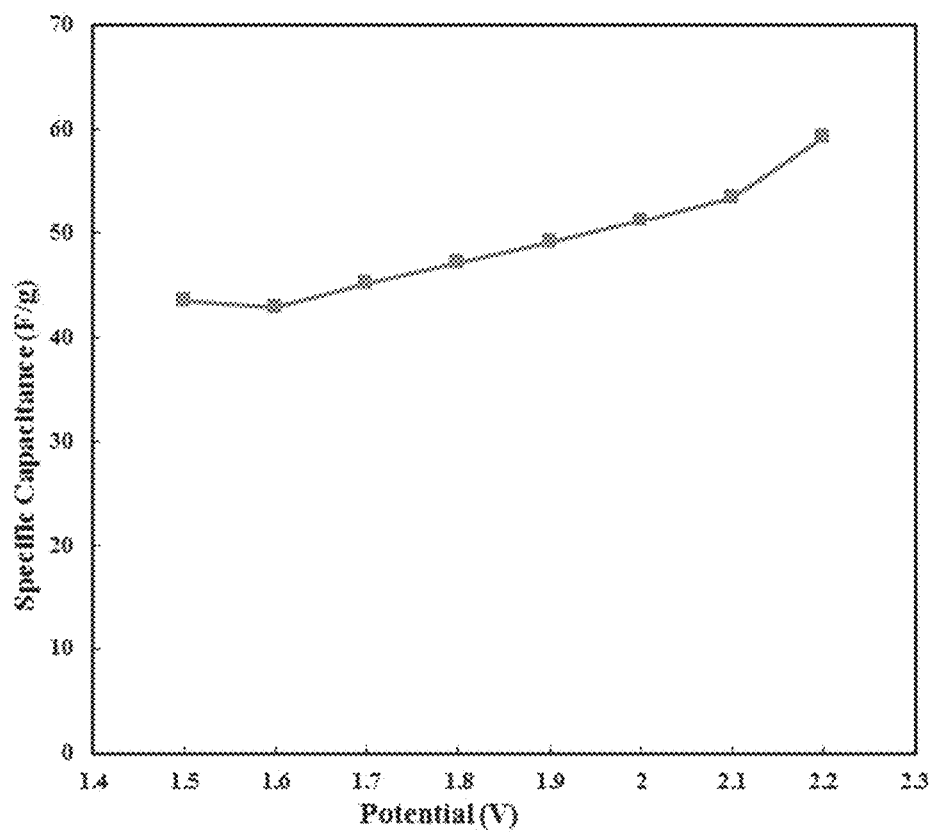
FIG. 7 shows the results of calculation of specific capacitance per weight of the cathode active material based on the results of FIG. 5.

In the aluminum ion capacitor of Example 1, the weight of the cathode is 8.54 mg and the weight of the aluminum foil is 64.4 mg. FIG. 4 shows the specific capacitance per weight, calculated based on the sum of the weights of the cathode and the anode, and FIG. 5 shows the specific capacitance per weight, calculated based on the weight of the cathode. YP50FH activated carbon, which is the active material contained in the cathode, constitutes 85 wt % of the cathode, and thus, the results of calculation of specific capacitance per weight of the cathode active material based on FIGS. 4 and 5 are illustrated in FIGS. 6 and 7.

As mentioned above, the aluminum ion capacitor of Example 1 is found to have considerably high energy density. Hence, a supercapacitor having sufficient energy density may be manufactured at relatively low material cost through a simple manufacturing process, compared to conventional lithium ion capacitors using lithium ions. Although increasing the energy density of a conventional lithium ion capacitor is limited due to the use of doped lithium, the aluminum foil or the like may be used without any limitation as the anode in the aluminum ion capacitor of Example 1, and thus there is no problem of decreasing energy density.

Figure 8:
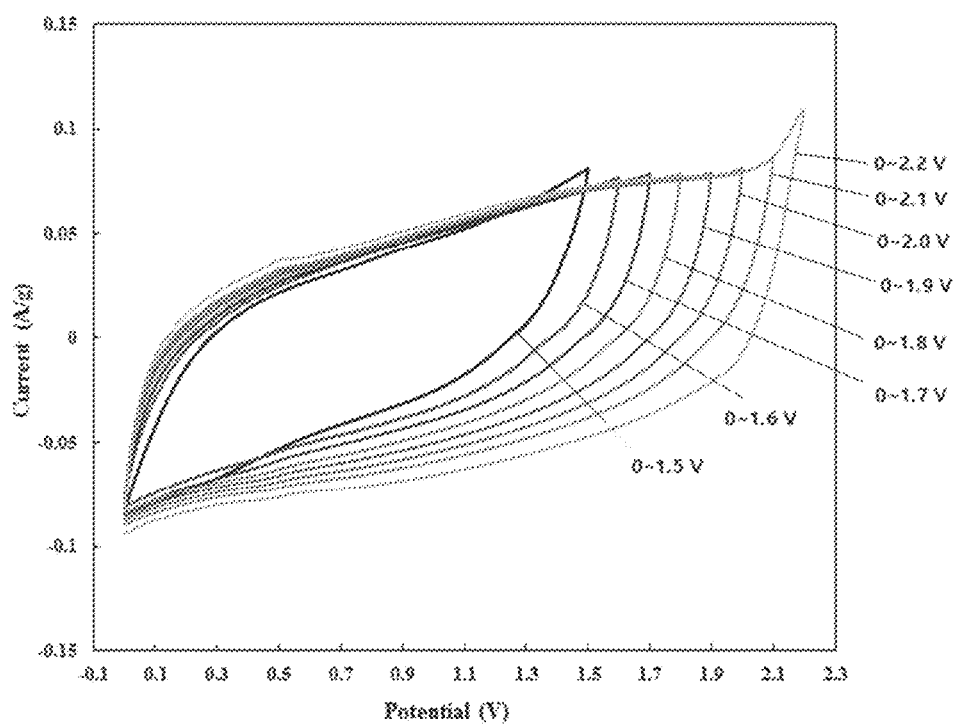
FIG. 8 shows the cyclic voltammograms of the aluminum ion capacitor of Example 1.

FIG. 8 shows cyclic voltammograms of the aluminum ion capacitor of Example 1.

A cyclic voltammogram (CV) is obtained by measuring current depending on potential over time in a manner in which the potential of the electrode is increased from an initial level to a predetermined level and then decreased again to the original level, thus exhibiting activity upon charge and discharge of the device. These cyclic voltammograms illustrate the shape of a typical CV curve of a supercapacitor, which means that the aluminum ion capacitor of Example 1, configured such that the electrical double layer is formed at only the cathode and such that the intercalation and deintercalation of aluminum ions are performed at the anode, manifests the charge-discharge behavior of a supercapacitor.

Also, the higher the applied potential, the larger the area of the closed curve. This is due to an increase in specific capacitance, which matches the aforementioned results of measurement of specific capacitance.

Figure 9:
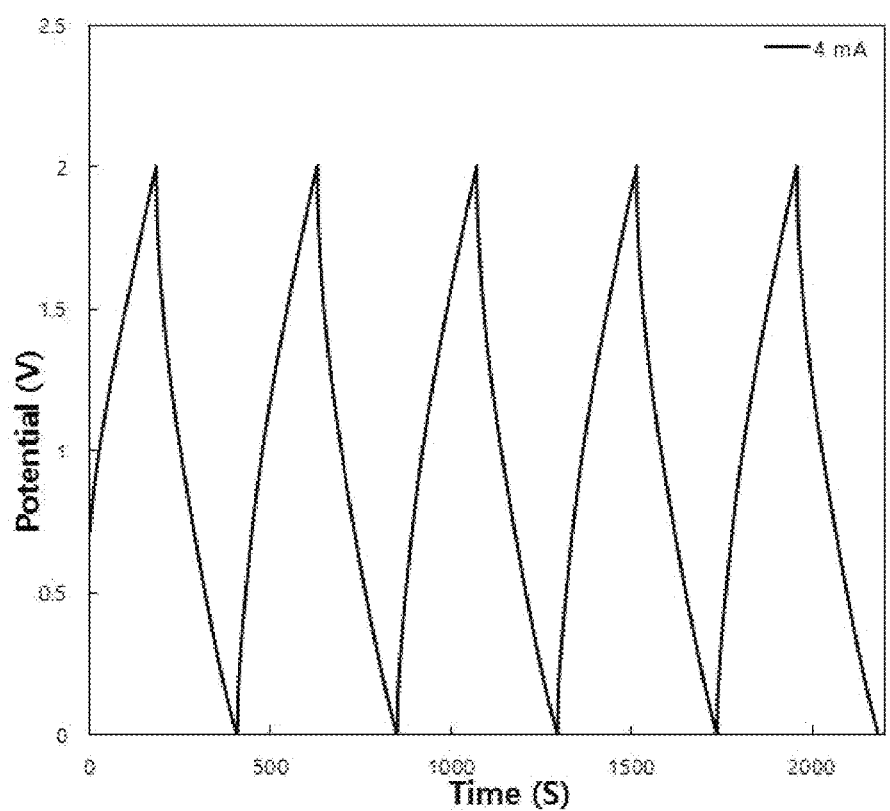
FIG. 9 is a graph showing the constant-current charge and discharge of the aluminum ion capacitor of Example 1.
Figure 10:
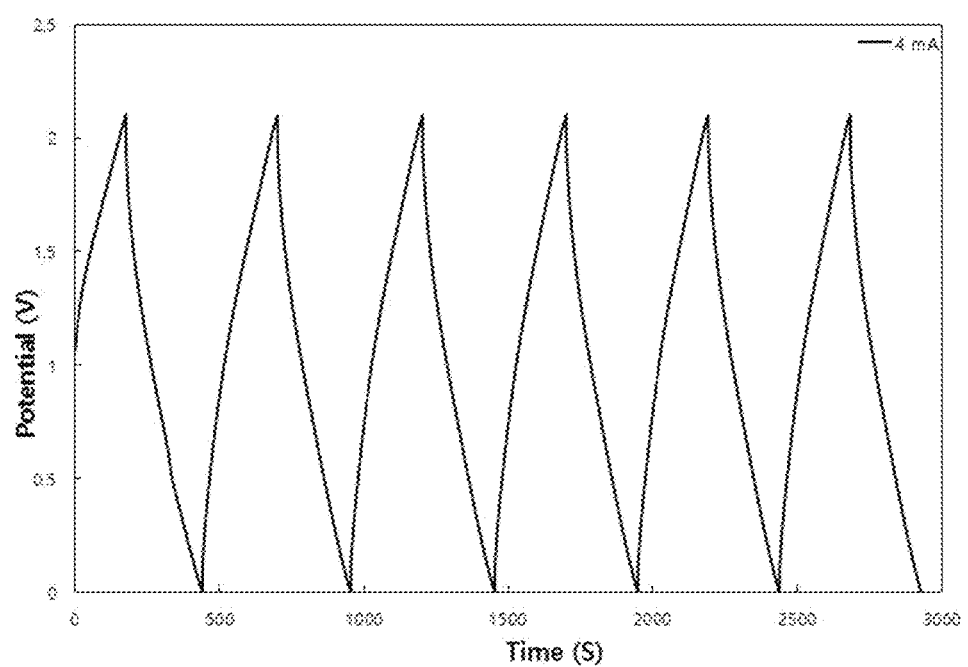
FIG. 10 is a graph showing the constant-current charge and discharge of the aluminum ion capacitor of Example 1.

FIGS. 9 and 10 are graphs showing the constant-current charge and discharge of the aluminum ion capacitor of Example 1.

The charge-discharge current was fixed to 4 mA, and charge and discharge were performed in the range of 0 to 2 V in FIG. 9 and in the range of 0 to 2.1 V in FIG. 10. As shown in the drawings, the aluminum ion capacitor of Example 1 showed a typical triangular-shaped charge-discharge curve corresponding to the characteristics of an ideal capacitor, and furthermore, stable charge and discharge were possible even upon cycle repetition.

EXAMPLE 2

The aluminum ion capacitor of Example 2 has the same structure as that of the aluminum ion capacitor of Example 1, with the exception of some constituents thereof.

A cathode was formed as in Example 1, by applying a slurry, comprising 85 wt % of YP50FH activated carbon, 7 wt % of super-P, 3 wt % of carboxymethyl cellulose (CMC) and 5 wt % of styrene-butadiene rubber (SBR), to an area of 2.54 cm$^2$ on a current collector made of gold.

An anode was formed by attaching aluminum foil having a thickness of 2 μm thinner than that of Example 1 to a current collector made of gold.

An electrolyte was formed by dissolving AlCl$_3$ in an ionic liquid, namely [EMIM]Cl, as in Example 1, wherein the ratio of AlCl$_3$:[EMIM]Cl was adjusted to 1.8:1.

The aluminum ion capacitor of Example 2 thus configured was measured for electrochemical properties.

Figure 11:
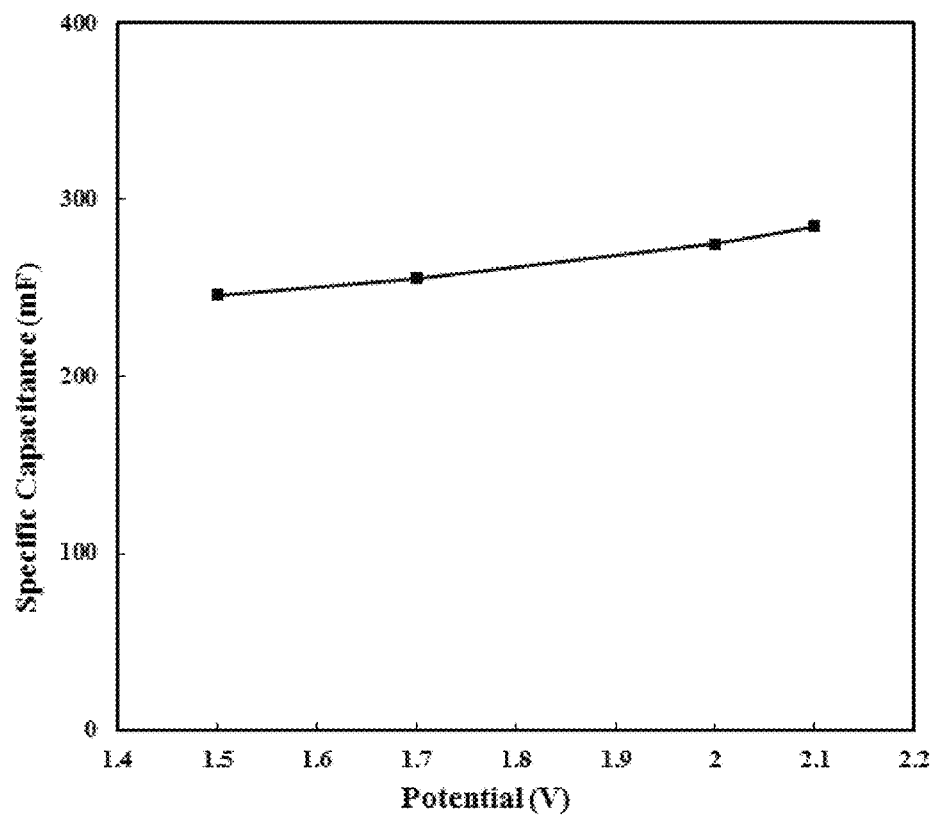
FIG. 11 shows the results of measurement of specific capacitance depending on the potential window in the aluminum ion capacitor of Example 2.

FIG. 11 shows the results of measurement of specific capacitance depending on the potential window in the aluminum ion capacitor of Example 2.

The specific capacitance of the aluminum ion capacitor was measured at different potentials, and the scan rate was 10 mV/S. The aluminum ion capacitor of Example 2 exhibited a specific capacitance of about 250 mF or more at 1.5 V, and the specific capacitance was gradually increased with an increase in potential, and was measured to be about 300 mF at 2.1 V.

Figure 12:
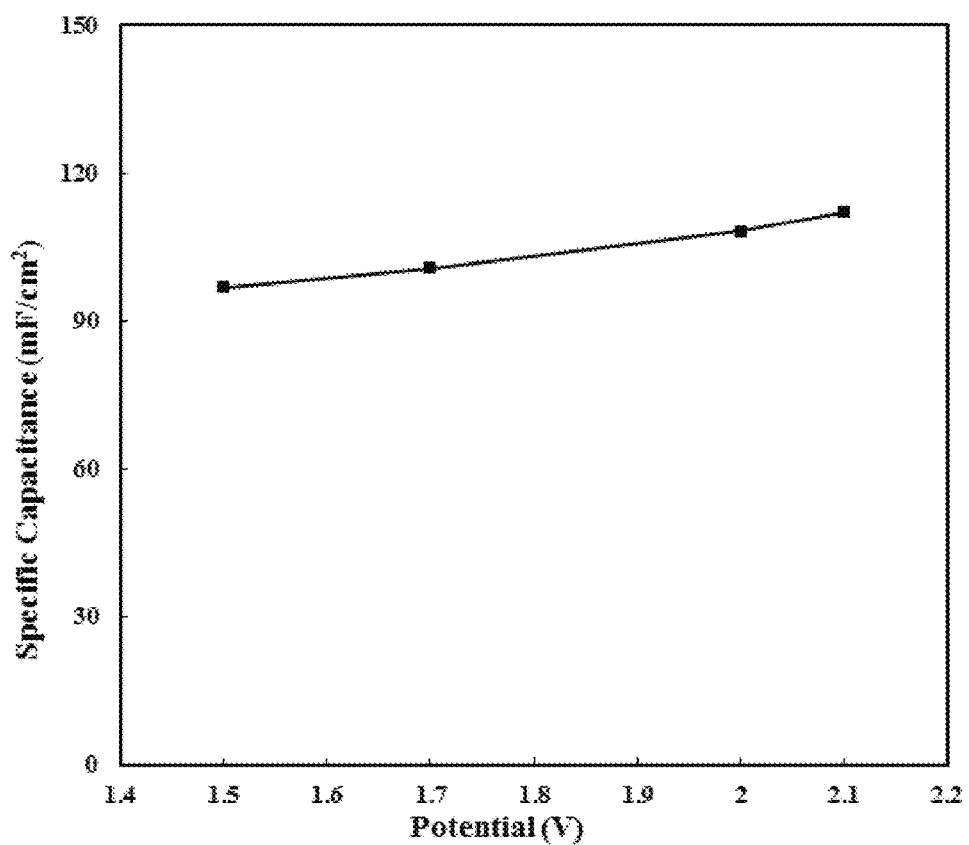
FIG. 12 shows the results of calculation of specific capacitance per area based on the results of specific capacitance of FIG. 11.

FIG. 12 shows the results of calculation of specific capacitance per area based on the results of specific capacitance of FIG. 11.

As described above, the area of the cathode applied on the current collector was 2.54 cm$^2$, and the aluminum ion capacitor of Example 2 exhibited superior results of 90 mF or more per unit area (1 cm$^2$).

Figure 13:
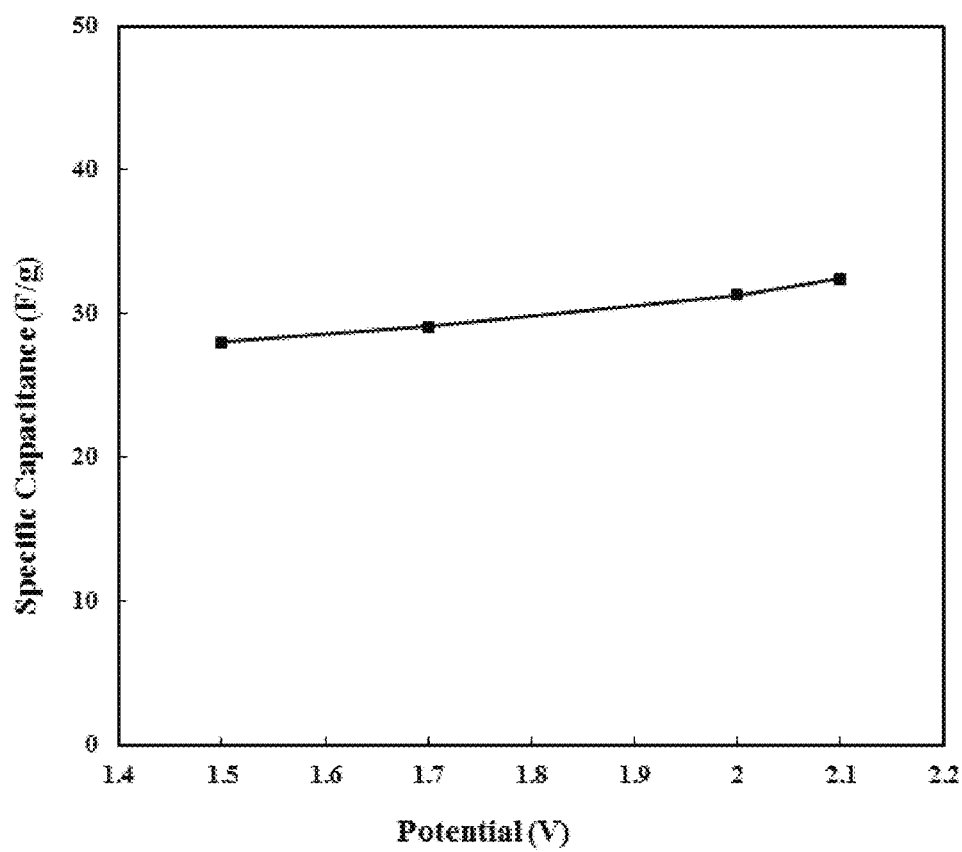
FIG. 13 shows the results of calculation of specific capacitance per total electrode weight based on the results of specific capacitance of FIG. 11.
Figure 14:
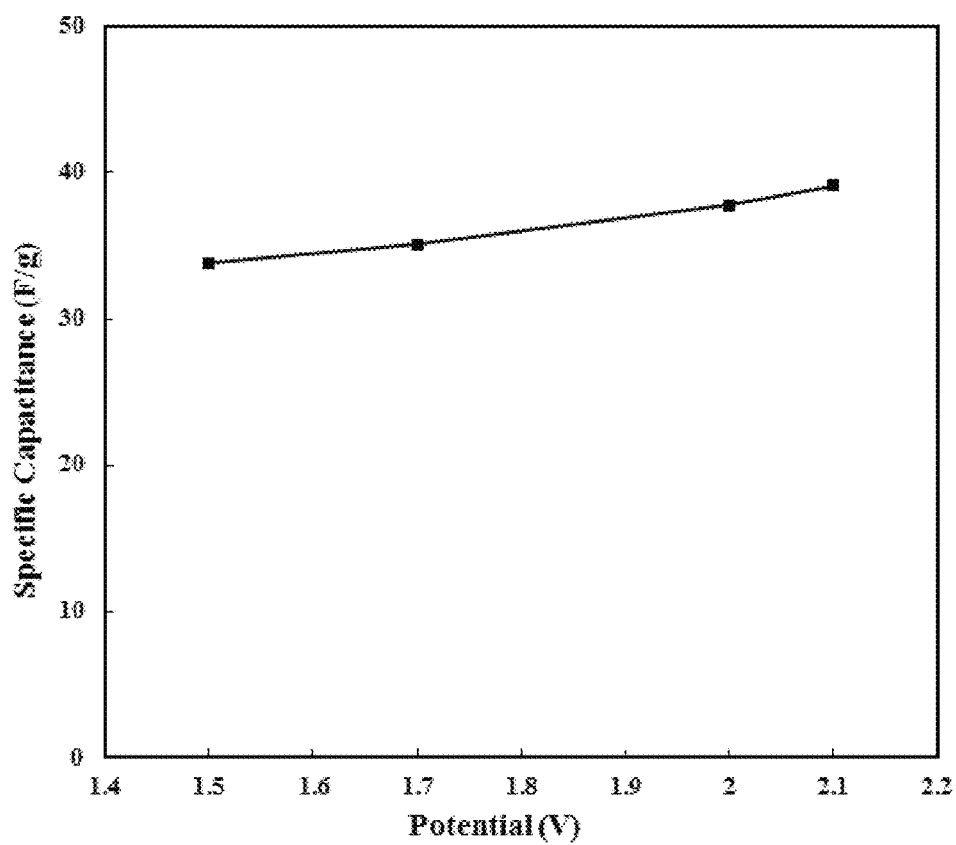
FIG. 14 shows the results of calculation of specific capacitance per weight of the cathode based on the results of specific capacitance of FIG. 11.

FIG. 13 shows the results of calculation of specific capacitance per total electrode weight based on the results of specific capacitance of FIG. 11, and FIG. 14 shows the results of calculation of specific capacitance per weight of the cathode.

In the aluminum ion capacitor of Example 2, the weight of the cathode is 7.2874 mg and the weight of the aluminum foil is 1.4915 mg. The aluminum ion capacitor of Example 2 exhibited a specific capacitance close to 30 F/g at 1.5 V based on the total weight of electrodes, and the specific capacitance was gradually increased with an increase in potential, and was measured to be 30 F/g or more at 2.1 V. Meanwhile, YP50FH activated carbon, which is the cathode active material contained in the cathode, constitutes 85 wt % of the cathode, and thus, the results of FIG. 14 may be obtained when converted on the basis of the weight of the cathode active material.

Accordingly, the aluminum ion capacitor of Example 2 had considerably high energy density, and improved results could be obtained even when using the thinner aluminum foil as the anode, compared to Example 1.

Figure 15:
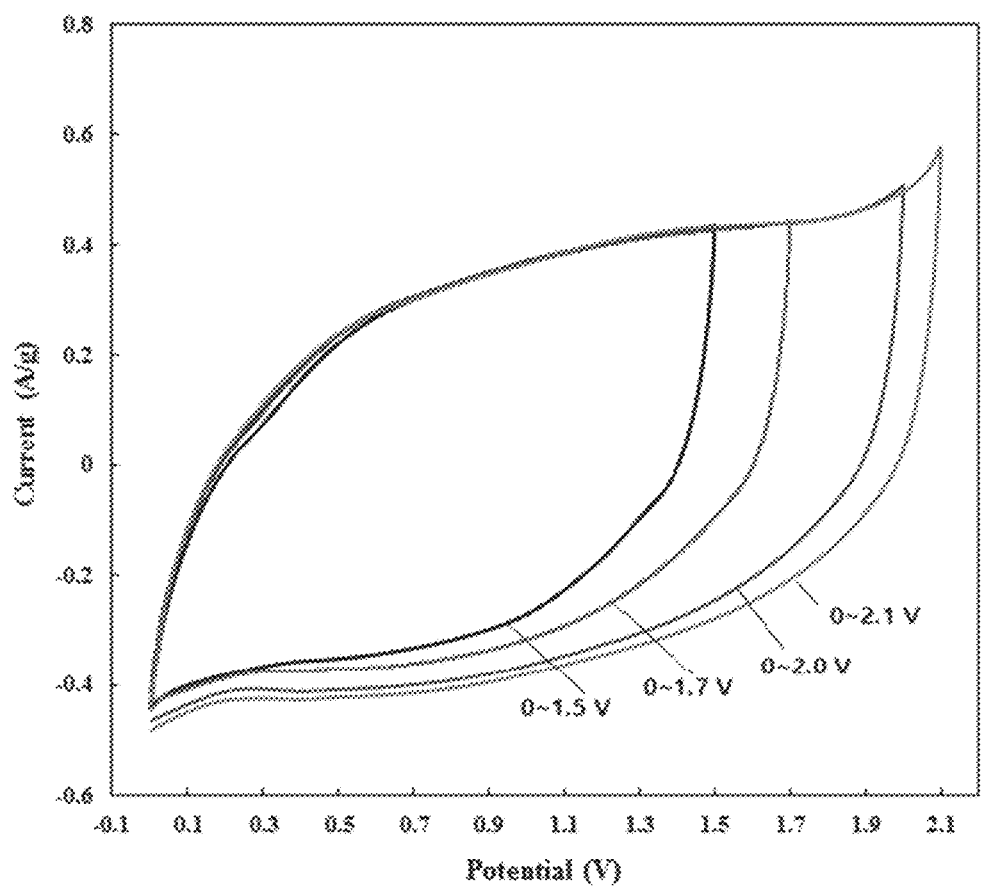
FIG. 15 shows the cyclic voltammograms measured depending on changes in applied potential in the aluminum ion capacitor of Example 2.

FIG. 15 shows the cyclic voltammograms measured depending on changes in applied potential in the aluminum ion capacitor of Example 2.

These cyclic voltammograms illustrate the shape of a typical CV curve of a supercapacitor, which means the charge-discharge behavior of a supercapacitor. Also, the higher the applied potential, the greater the area of the closed curve. This is due to an increase in specific capacitance, which matches the aforementioned results of measurement of specific capacitance.

Figure 16:
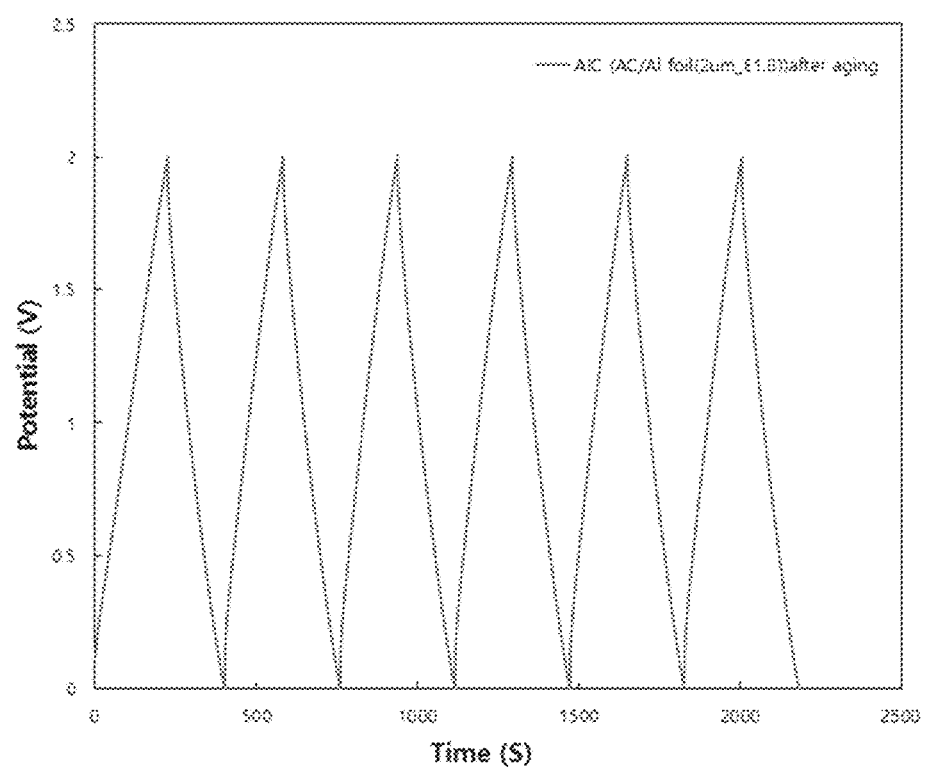
FIG. 16 is a graph showing the constant-current charge and discharge of the aluminum ion capacitor of Example 2.
Figure 17:
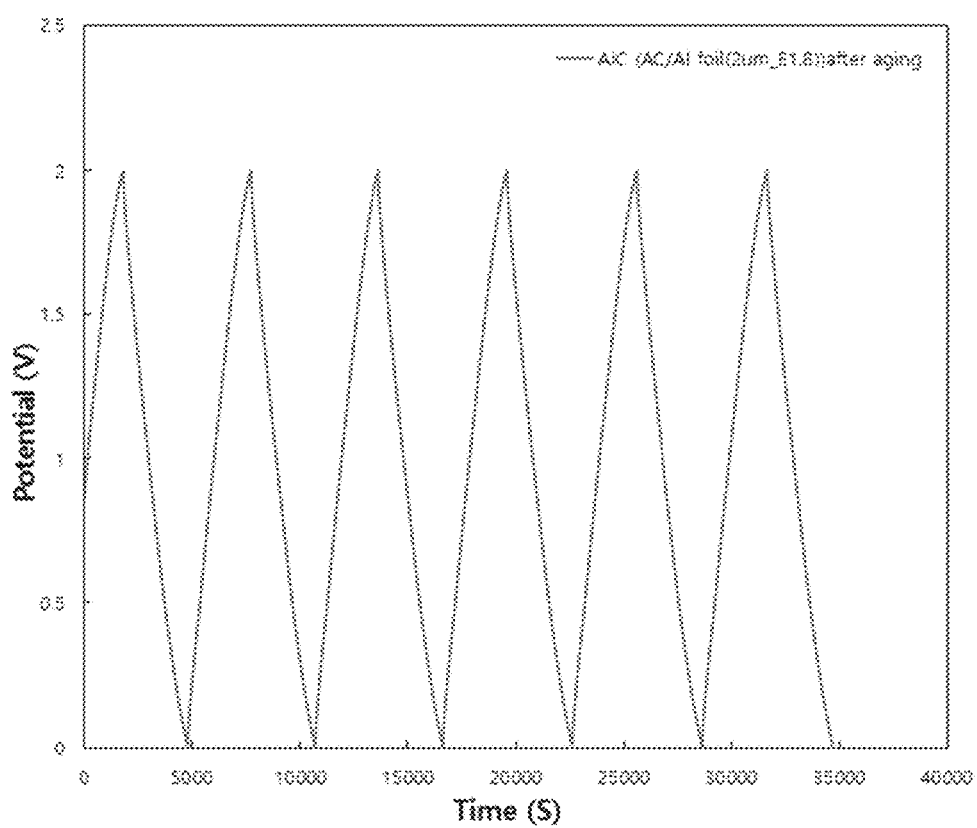
FIG. 17 is a graph showing the constant-current charge and discharge of the aluminum ion capacitor of Example 2.

FIGS. 16 and 17 are graphs showing constant-current charge and discharge of the aluminum ion capacitor of Example 2.

FIG. 16 shows the results of charge and discharge in the range of 0 to 2 V under the condition that the charge-discharge current is fixed to 4 mA, and FIG. 17 shows the results of charge and discharge in the range of 0 to 2 V under the condition that the charge-discharge current is fixed to 400 μA. In both of the above two cases, a typical triangular-shaped charge-discharge curve, corresponding to the characteristics of an ideal capacitor, is shown, and also, stable charge and discharge may be performed even upon cycle repetition. The specific capacitance per total weight of the aluminum ion capacitor is 38.73 F/g upon discharge at 4 mA and is 63.56 F/g upon discharge at 400 μA. From this, the greatest capacitance was confirmed to result upon discharge at 400 μA.

Figure 18:
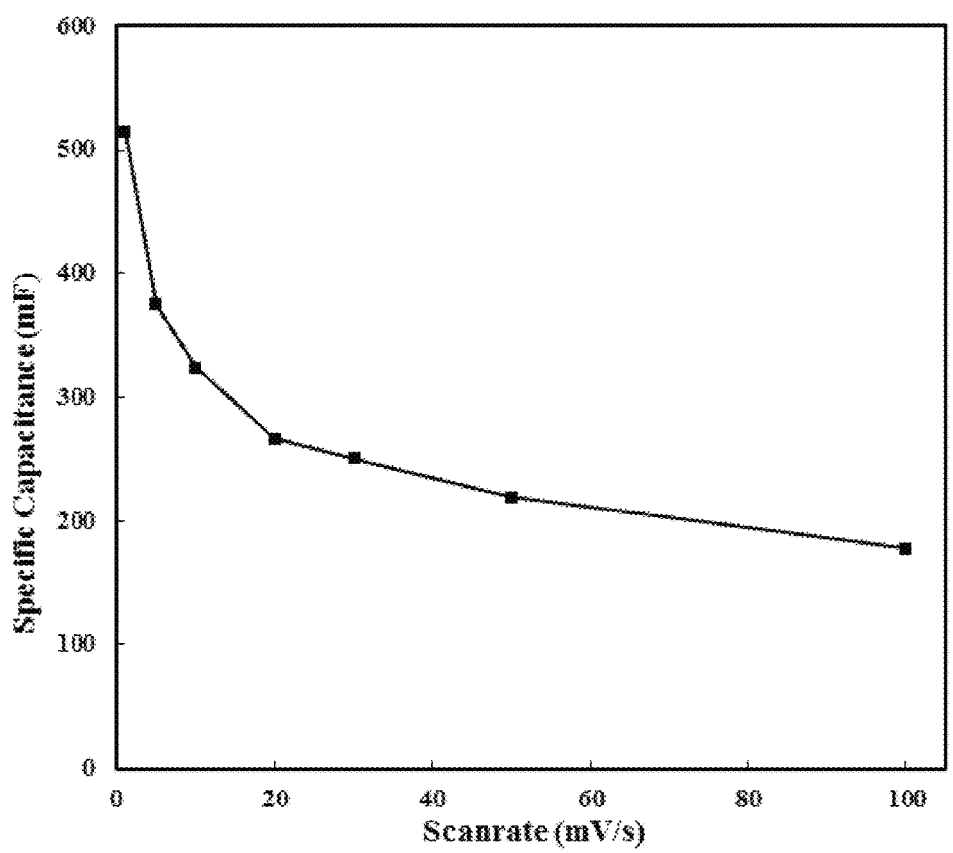
FIG. 18 shows the results of measurement of specific capacitance depending on the scan rate in the aluminum ion capacitor of Example 2.

FIG. 18 shows the results of measurement of specific capacitance depending on the scan rate in the aluminum ion capacitor of Example 2.

The specific capacitance of the aluminum ion capacitor was measured while the scan rate was changed in the range of 1 to 100 mV/S at 2 V. The aluminum ion capacitor of Example 2 was decreased in specific capacitance with an increase in scan rate.

Figure 19:
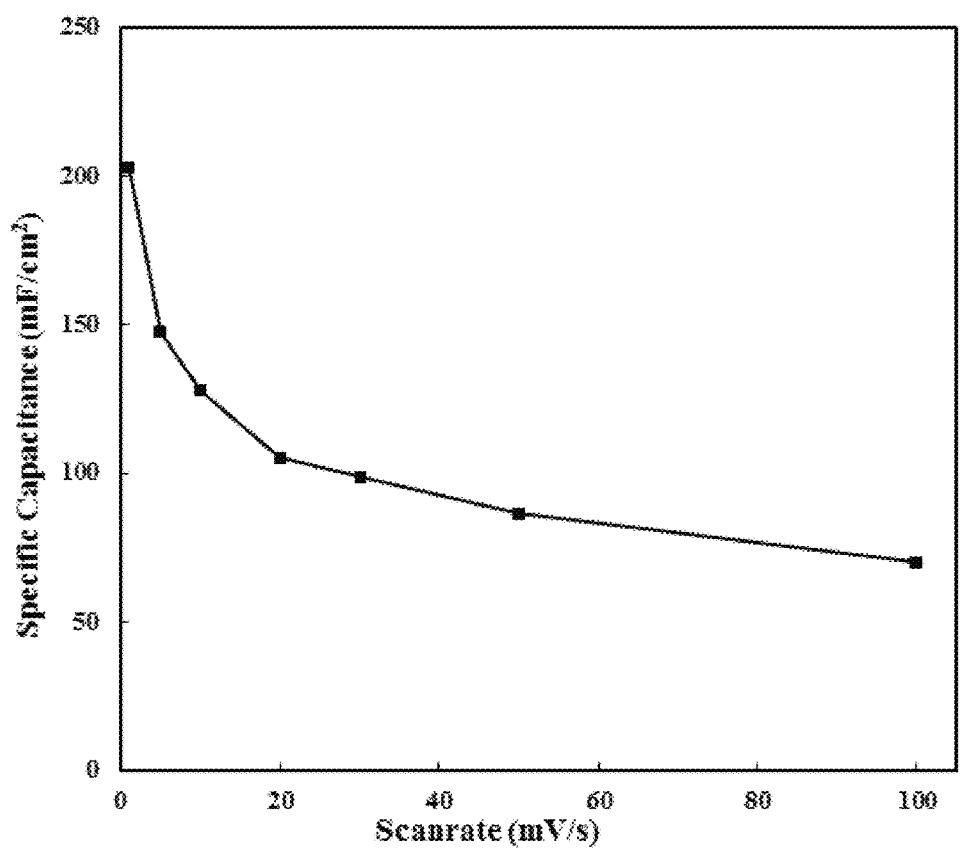
FIG. 19 shows the results of calculation of specific capacitance per area based on the results of specific capacitance of FIG. 18.
Figure 20:
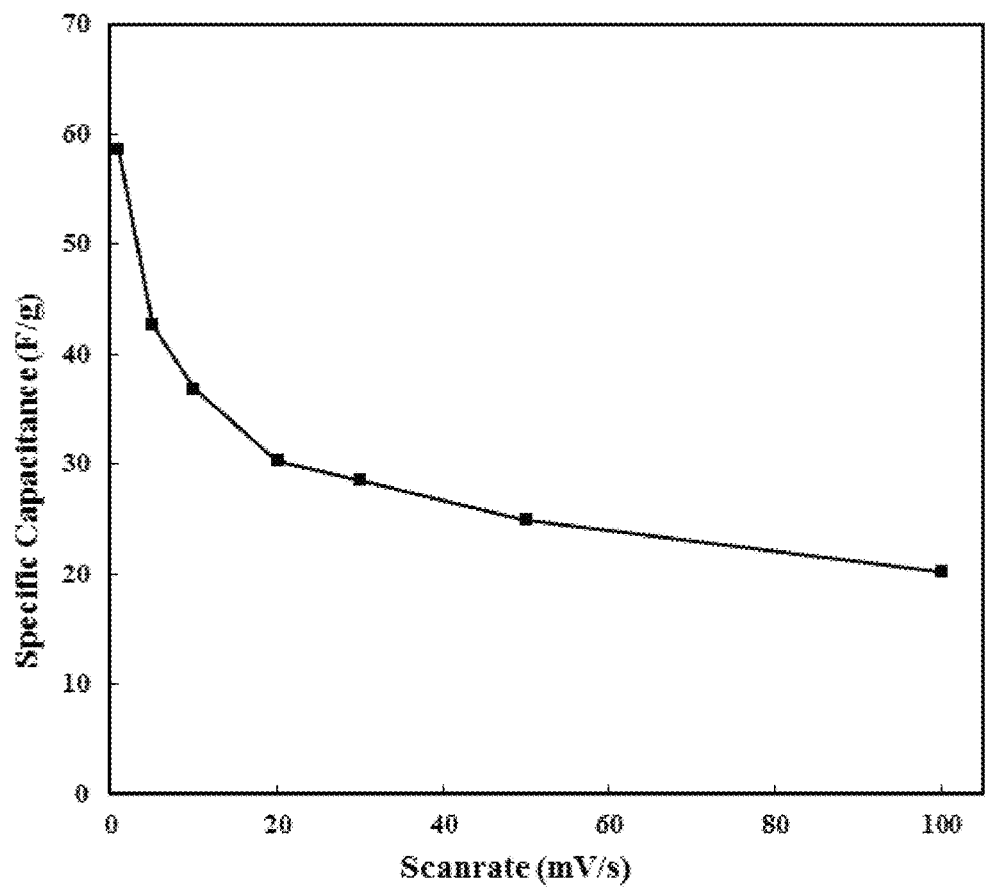
FIG. 20 shows the results of calculation of specific capacitance per total electrode weight based on the results of specific capacitance of FIG. 18.
Figure 21:
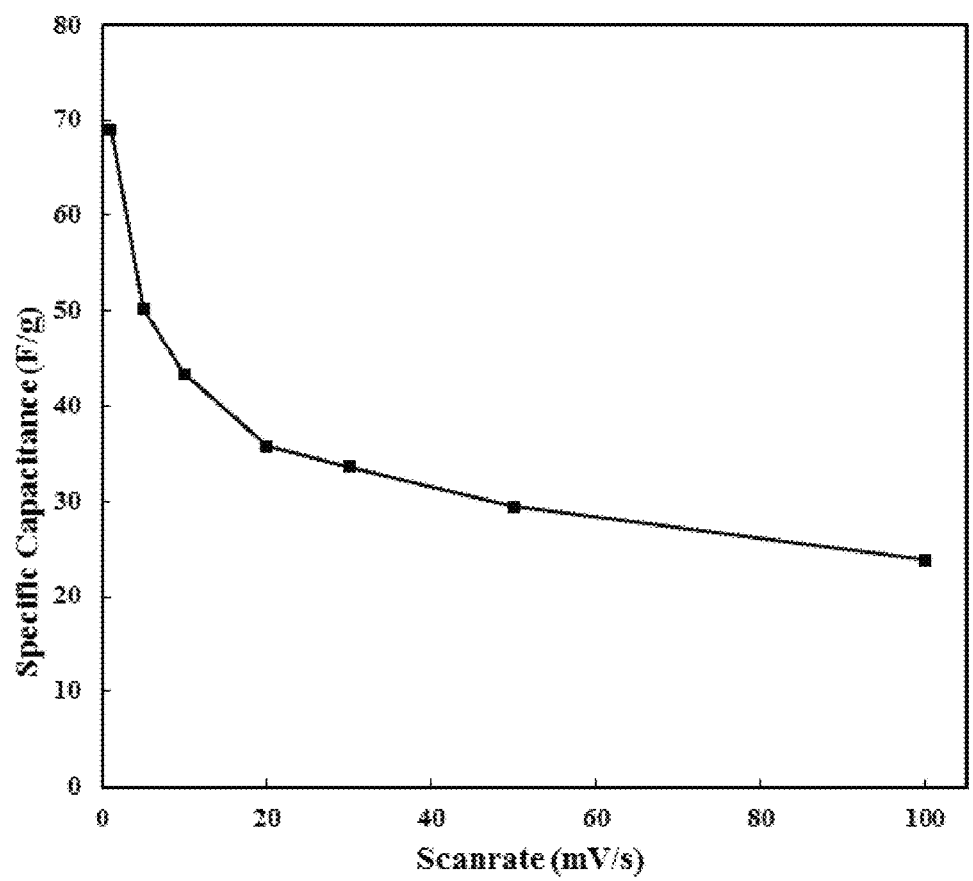
FIG. 21 shows the results of calculation of specific capacitance per weight of the cathode based on the results of specific capacitance of FIG. 18.

FIG. 19 shows the results of calculation of specific capacitance per area based on the results of specific capacitance of FIG. 18, FIG. 20 shows the results of calculation of specific capacitance per total electrode weight based on the results of specific capacitance of FIG. 18, and FIG. 21 shows the results of calculation of specific capacitance per weight of the cathode.

FIG. 19 shows the results obtained from FIG. 18 on the basis that the area of the cathode applied on the current collector is 2.54 cm$^2$, FIG. 20 shows the results obtained on the basis that the weight of the cathode is 7.2874 mg and the weight of the anode is 1.4915 mg, and FIG. 21 shows the results based on the proportion of the active material contained in the cathode.

Figure 22:
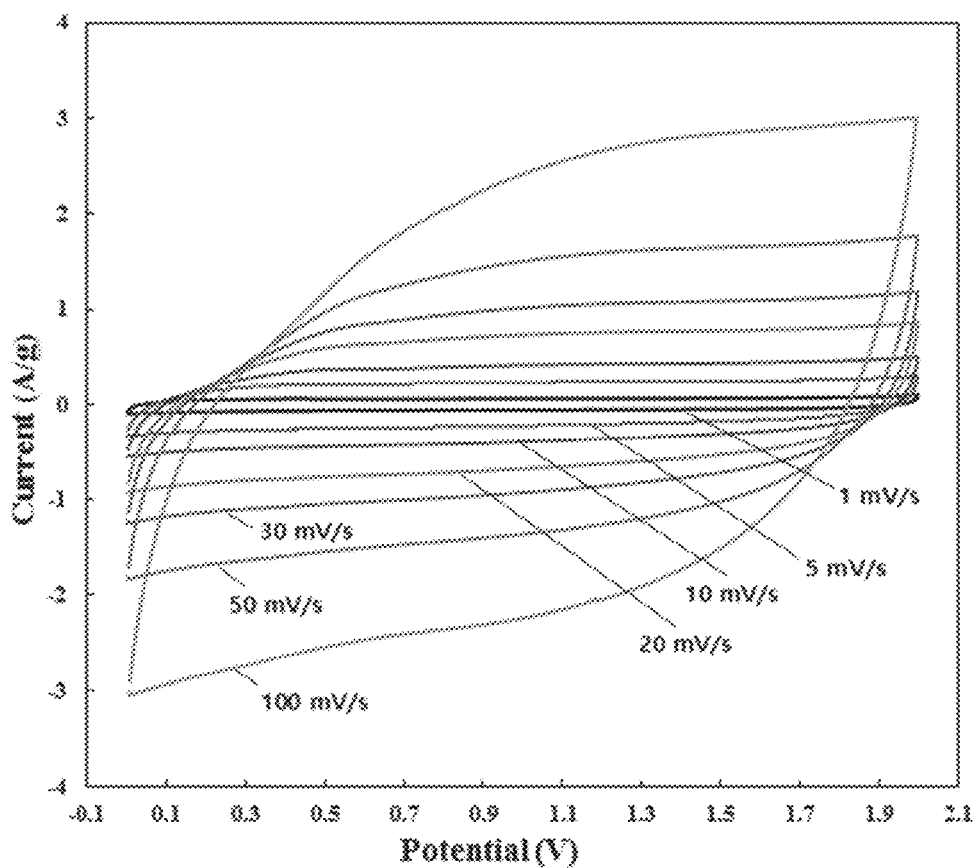
FIG. 22 shows the cyclic voltammograms measured depending on changes in the scan rate in the aluminum ion capacitor of Example 2.
Figure 23:
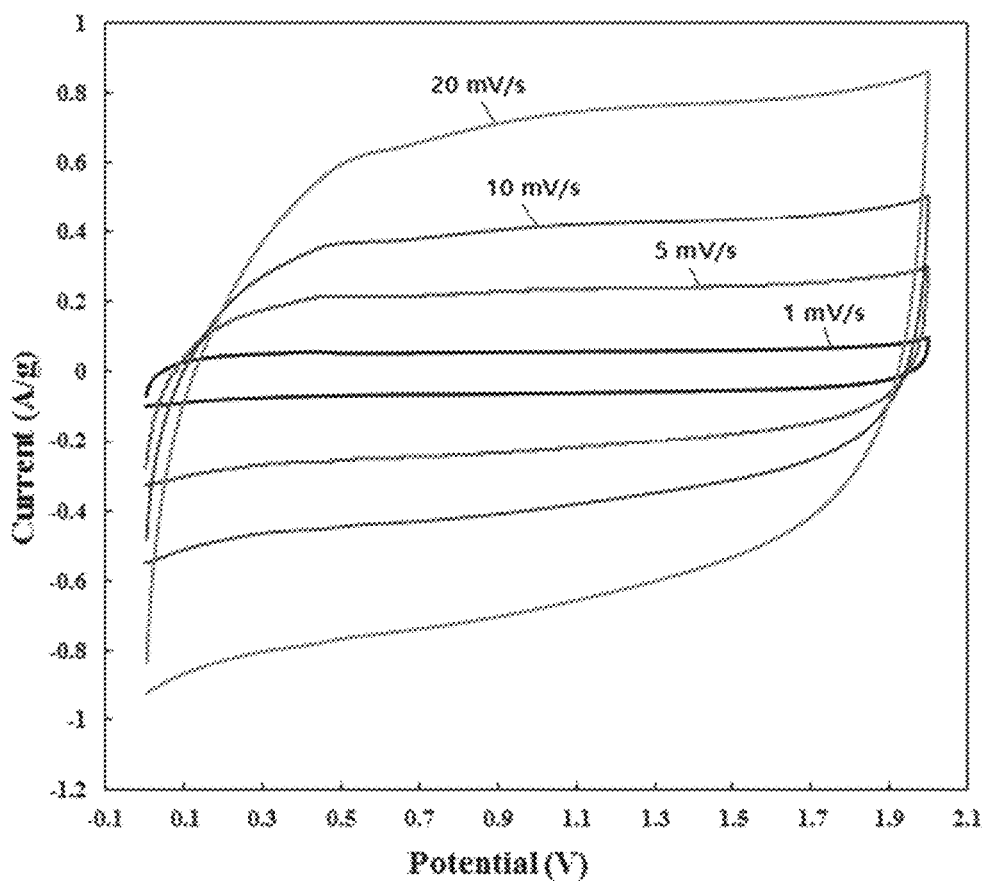
FIG. 23 shows the cyclic voltammograms measured depending on changes in the scan rate in the aluminum ion capacitor of Example 2.

FIGS. 22 and 23 show the cyclic voltammograms measured at different scan rates in the aluminum ion capacitor of Example 2.

The voltammograms were measured under the condition that the voltage was increased up to 2 V and the scan rate was changed to fall within the range of 1 to 100 mV/S. Further, FIG. 23 illustrates the results in the scan rate range of 1 to 20 mV/S. As described above, the CV curve of a supercapacitor was obtained, and the area of the closed curve is enlarged with an increase in scan rate.

Figure 24:
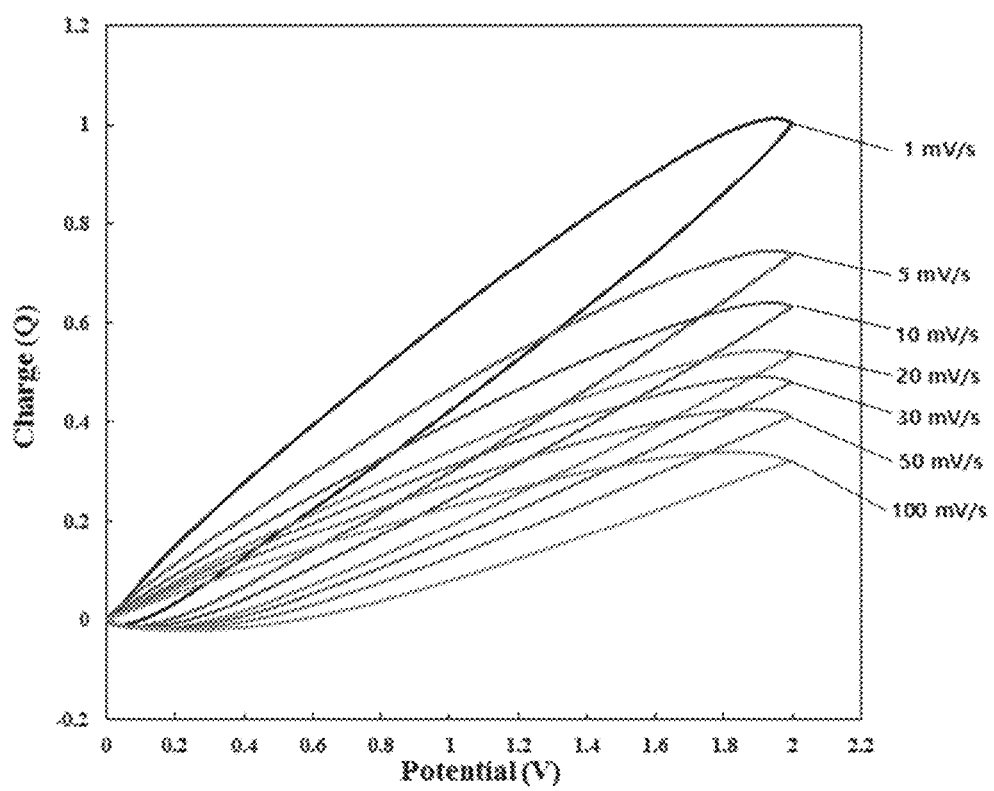
FIG. 24 shows the charge-potential curves measured depending on changes in the scan rate in the aluminum ion capacitor of Example 2.

FIG. 24 shows the charge-potential curves measured at different scan rates in the aluminum ion capacitor of Example 2.

The charge-potential curve was measured while the voltage was changed to 2 V, and the scan rate was set to the range of 1 to 100 mV/S. As the scan rate was increased, the maximum amount that could be charged was decreased.

Figure 25:
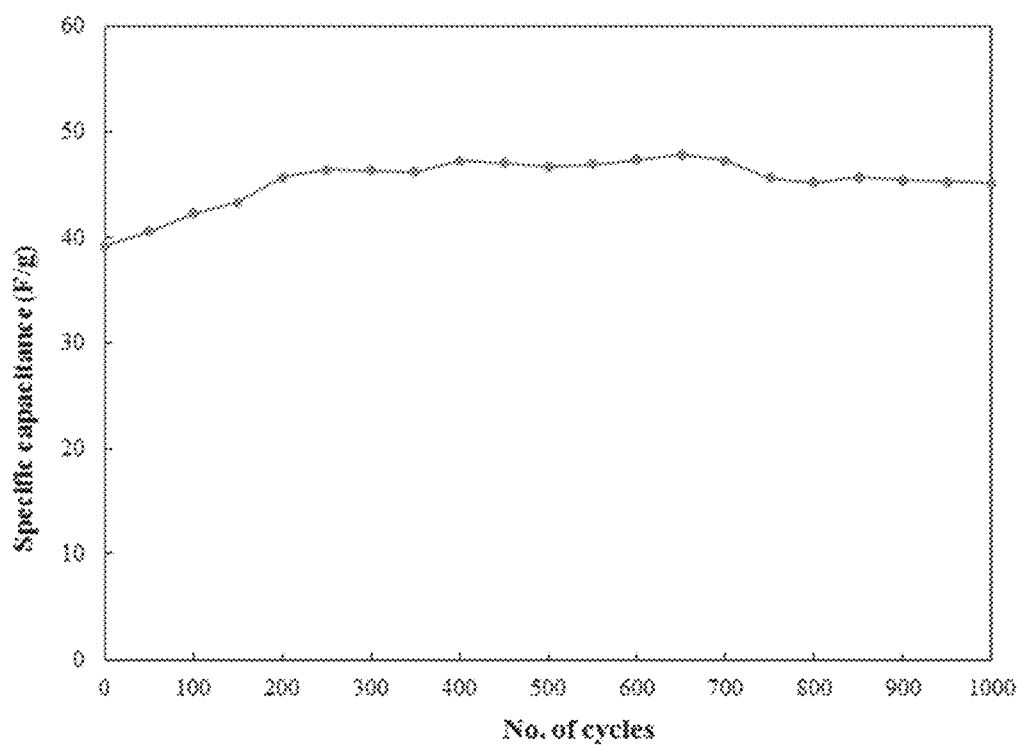
FIG. 25 shows the results of testing of charge-discharge cycles of the aluminum ion capacitor of Example 2.

FIG. 25 shows the results of testing of charge-discharge cycles in the aluminum ion capacitor of Example 2.

Based on the results of testing of about 1000 charge-discharge cycles at 4 mA, the capacitance was not decreased.

As described above, the aluminum ion capacitors of Examples 1 and 2 according to the present invention were found to have specific capacitance per area and specific capacitance per weight sufficient for use as an energy storage device, despite the formation of an anode having a simple structure using inexpensive aluminum, unlike the conventional lithium ion capacitor.

This is deemed to be because the aluminum anode in foil form is usable due to the stability of the aluminum material and because two or three electrons may be obtained from the aluminum ions, thereby increasing the energy density. Furthermore, no limitations are imposed on the structure of the aluminum anode, thus making it possible to sufficiently increase the power density.

Moreover, the capacitance is not decreased even upon 1000 charge-discharge cycles, thus exhibiting a long life.

EXAMPLE 3

The aluminum ion capacitor of Example 3 is different from the aforementioned capacitors of Examples 1 and 2 because activated carbon, as in the cathode, is used for a anode material, instead of the aluminum foil.

A cathode was formed as in Example 1 by applying a slurry, comprising 85 wt % of YP50FH activated carbon, 7 wt % of super-P, 3 wt % of carboxymethyl cellulose (CMC) and 5 wt % of styrene-butadiene rubber (SBR), to an area of 2.54 cm² on a current collector made of gold.

An electrolyte, obtained by dissolving $AlCl_3$ in an ionic liquid [EMIM]Cl as in the above Examples, was used, and the ratio of $AlCl_3$:[EMIM]Cl was adjusted to 1.8:1.

An anode having the same structure as that of the cathode was manufactured. The aluminum ion capacitor of Example 3 was configured such that the anode and the cathode had the same structure, but intercalation and deintercalation of aluminum ions were performed at the crystallized portion of activated carbon contained in the anode due to the use of the electrolyte including aluminum ions.

The electrochemical properties of the aluminum ion capacitor of Example 3 thus configured were measured.

Figure 26:
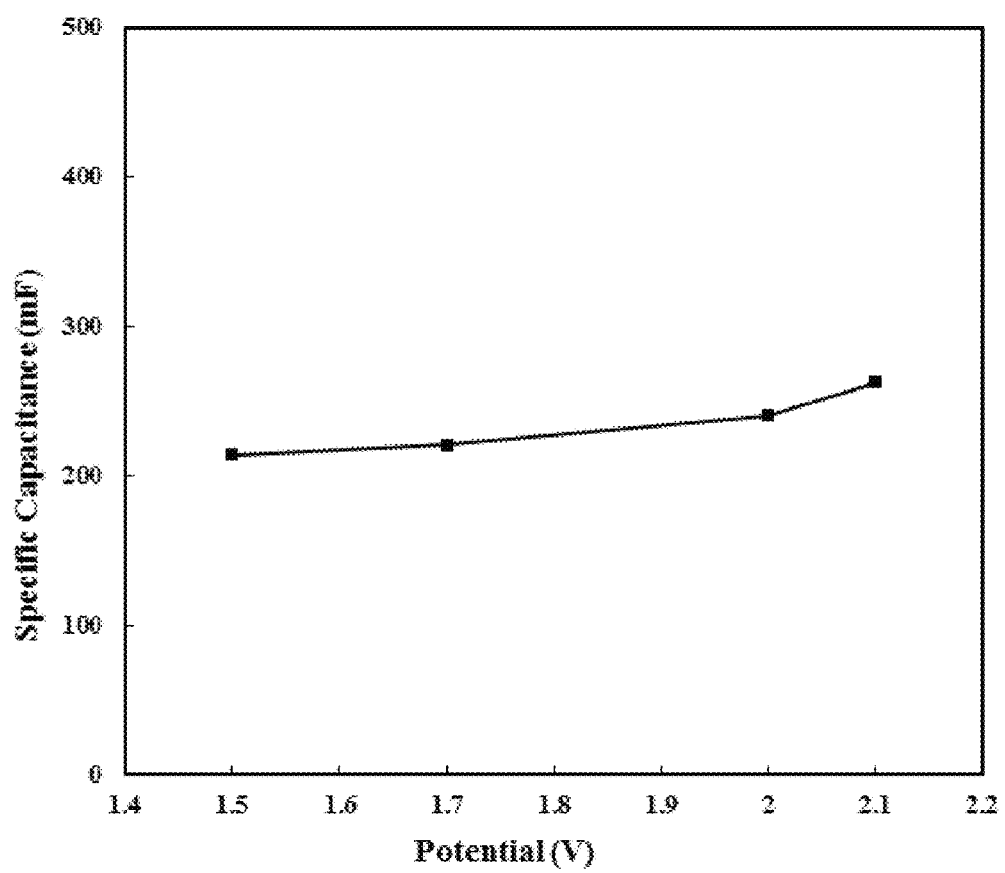
FIG. 26 shows the results of measurement of specific capacitance depending on the potential window in the aluminum ion capacitor of Example 3.

FIG. 26 shows the results of measurement of capacitance depending on the potential window in the aluminum ion capacitor of Example 3.

The specific capacitance of the aluminum ion capacitor was measured at different potentials, and the scan rate was 10 mV/S. The aluminum ion capacitor of Example 3 exhibited a specific capacitance of 200 mF or more at 1.5 V. The specific capacitance was gradually increased with an increase in potential, and thus approximated 300 mF at 2.1 V.

Figure 27:
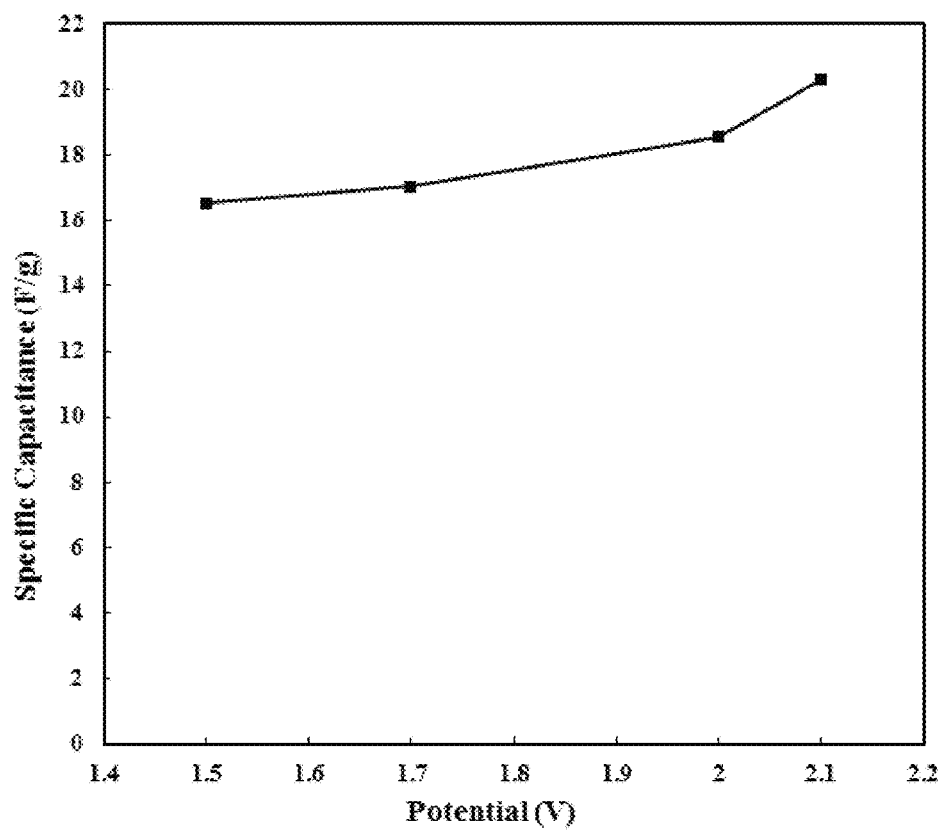
FIG. 27 shows the results of calculation of specific capacitance per total electrode weight based on the results of FIG. 26.
Figure 28:
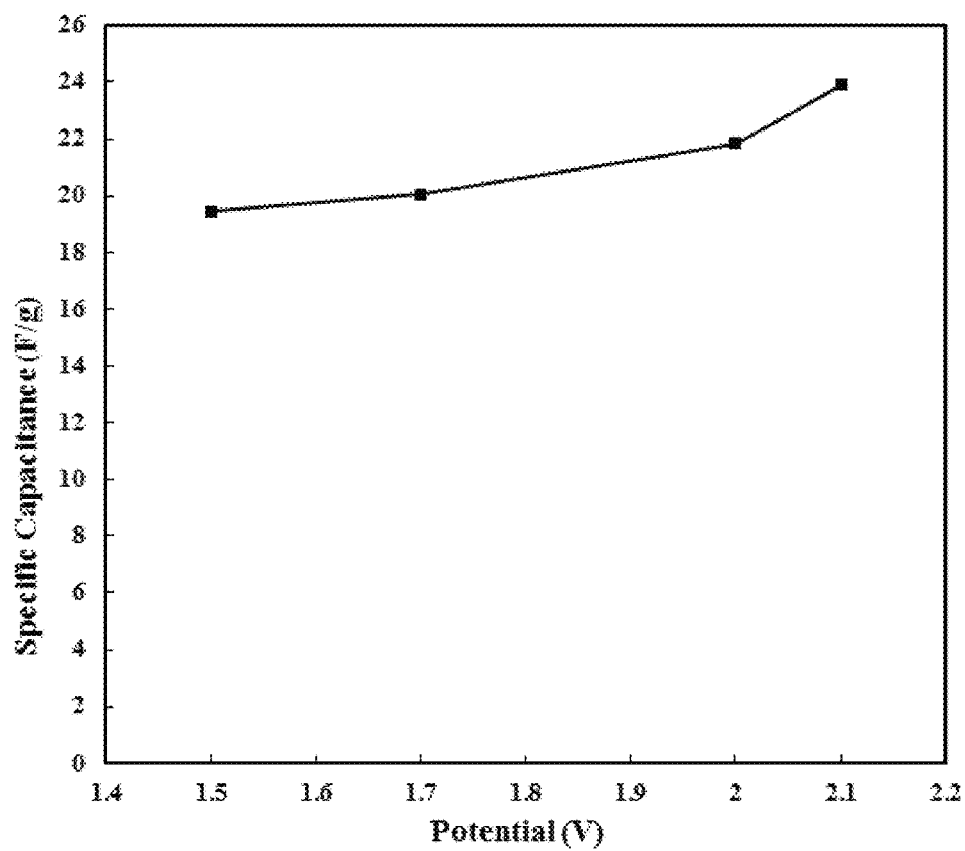
FIG. 28 shows the results of calculation of specific capacitance per weight of the active material based on the results of FIG. 26.

FIG. 27 shows the results of calculation of specific capacitance per total electrode weight based on the results of FIG. 26, and FIG. 28 shows the results of calculation of specific capacitance per weight of the active material.

In the aluminum ion capacitor of Example 3, the weight of the cathode is 6.5109 mg and the weight of the anode is 6.4202 mg. The aluminum ion capacitor of Example 3 exhibited a specific capacitance close to 17 F/g at 1.5 V based on the total weight of electrodes, and the specific capacitance was gradually increased with an increase in potential, reaching about 21 F/g at 2.1 V. Meanwhile, the active material YP50FH activated carbon, contained in the electrodes of Example 3, constitutes 85 wt % of each electrode, and thus, the results of FIG. 28 may be obtained when converted on the basis of the weight of the active material.

Figure 29:
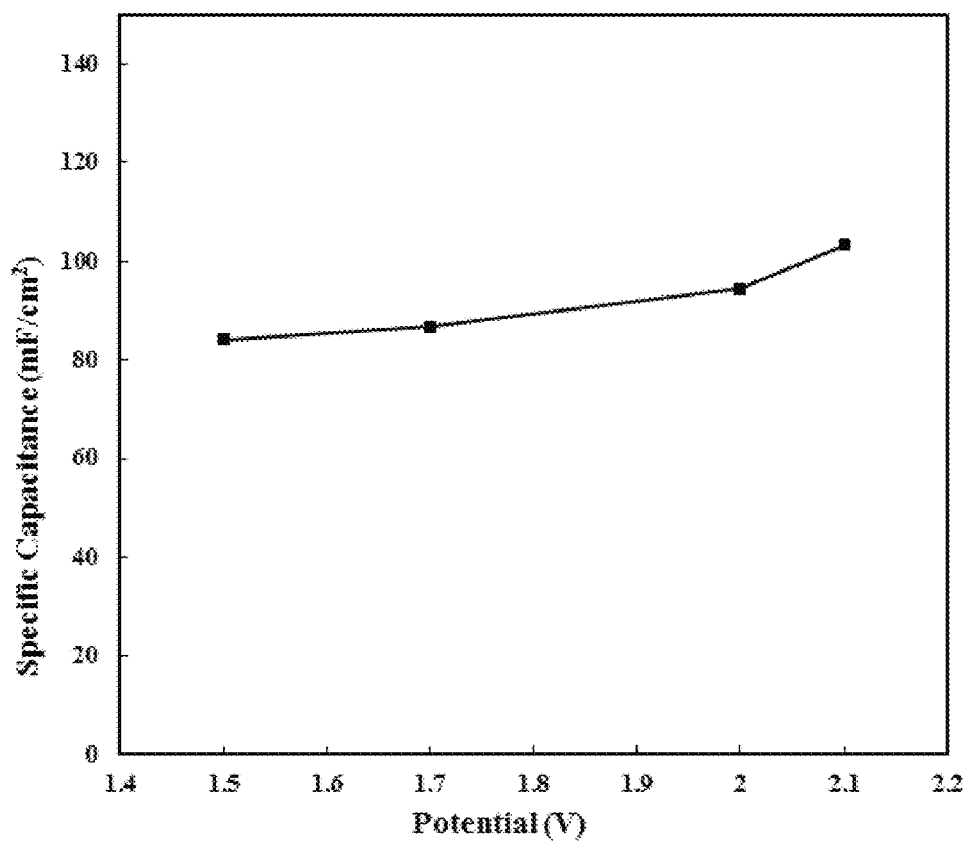
FIG. 29 shows the results of calculation of specific capacitance per area of the electrode based on the results of FIG. 26.

FIG. 29 shows the results of calculation of specific capacitance per area of the electrode based on the results of FIG. 26.

As described above, the area of each of the anode and the cathode applied on the current collector is 2.54 cm², and the aluminum ion capacitor of Example 3 can be found to exhibit superior results to the extent that the specific capacitance per unit area (1 cm²) is 80 mF/cm² or more at 1.5 V and is about 100 mF/cm² at 2.1 V.

Figure 30:
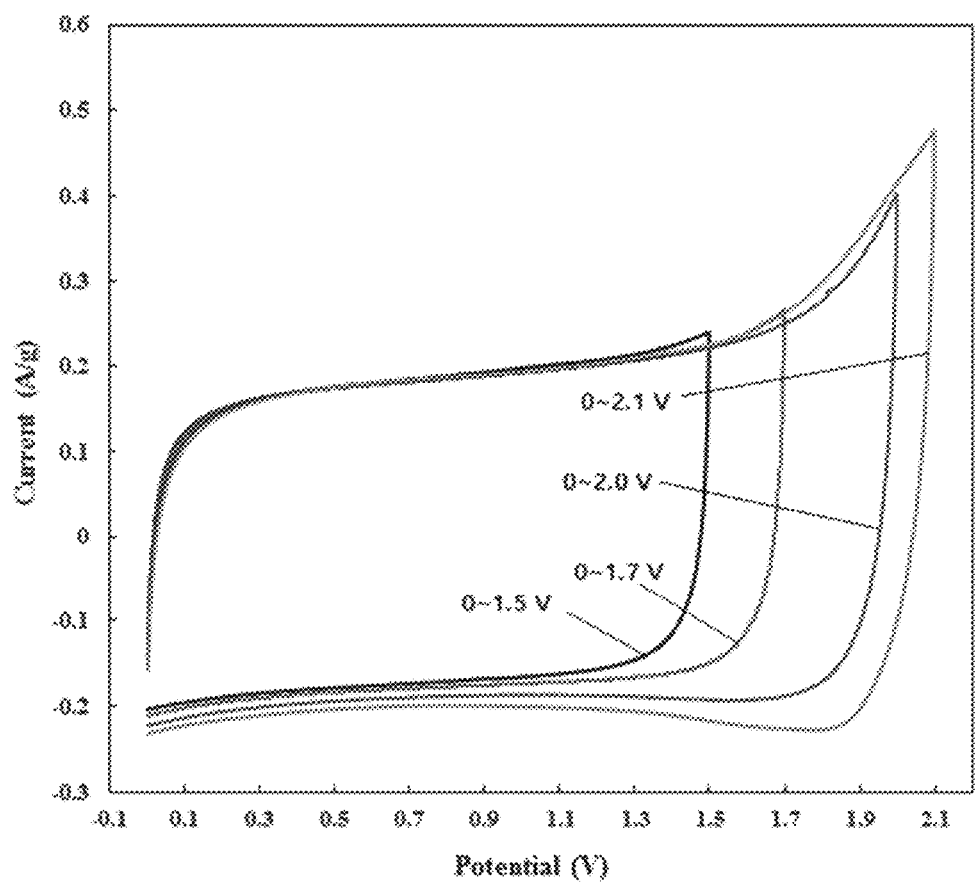
FIG. 30 shows the cyclic voltammograms measured depending on changes in applied potential in the aluminum ion capacitor of Example 3.

FIG. 30 shows the cyclic voltammograms measured depending on changes in applied potential in the aluminum ion capacitor of Example 3.

These cyclic voltammograms illustrate the shape of a typical CV curve of a supercapacitor. As the applied potential was increased, the area of the closed curve was enlarged, indicative of increased specific capacitance. Hence, these results matched the aforementioned results of measurement of specific capacitance.

Figure 31:
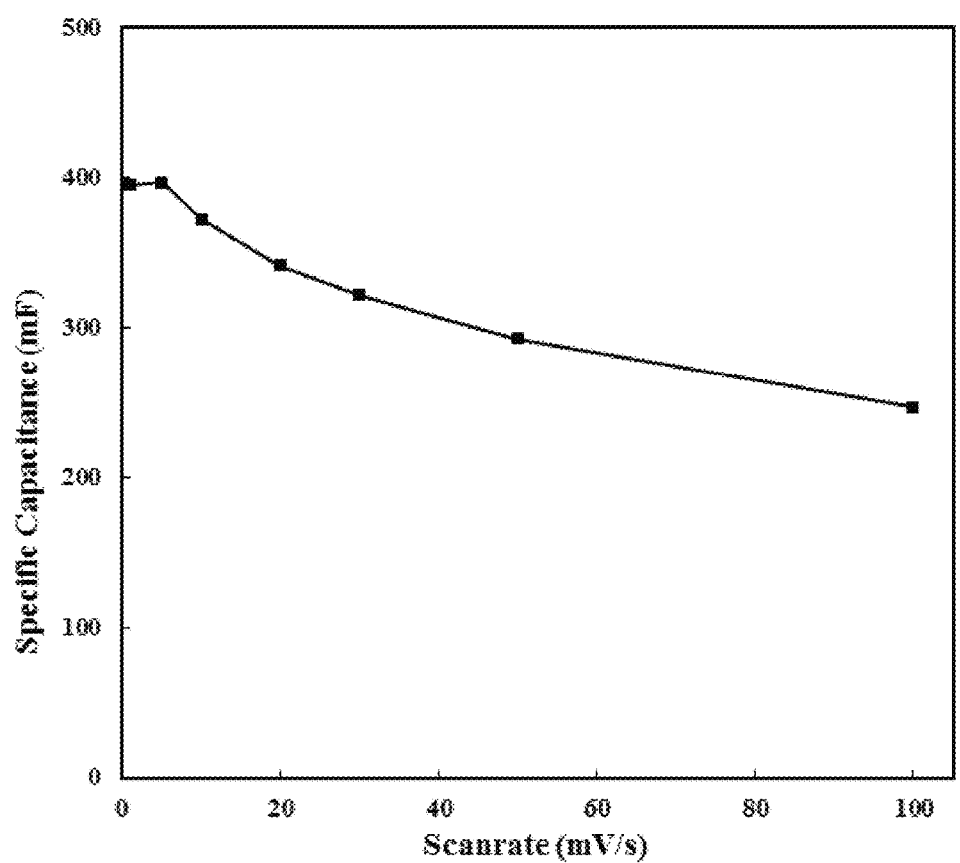
FIG. 31 shows the results of measurement of specific capacitance depending on the scan rate in the aluminum ion capacitor of Example 3.

FIG. 31 shows the results of measurement of specific capacitance depending on the scan rate in the aluminum ion capacitor of Example 3.

The specific capacitance of the aluminum ion capacitor was measured under the condition that the scan rate was changed in the range of 1 to 100 mV/S at 2 V. The specific capacitance was decreased with an increase in scan rate in the aluminum ion capacitor of Example 3.

Figure 32:
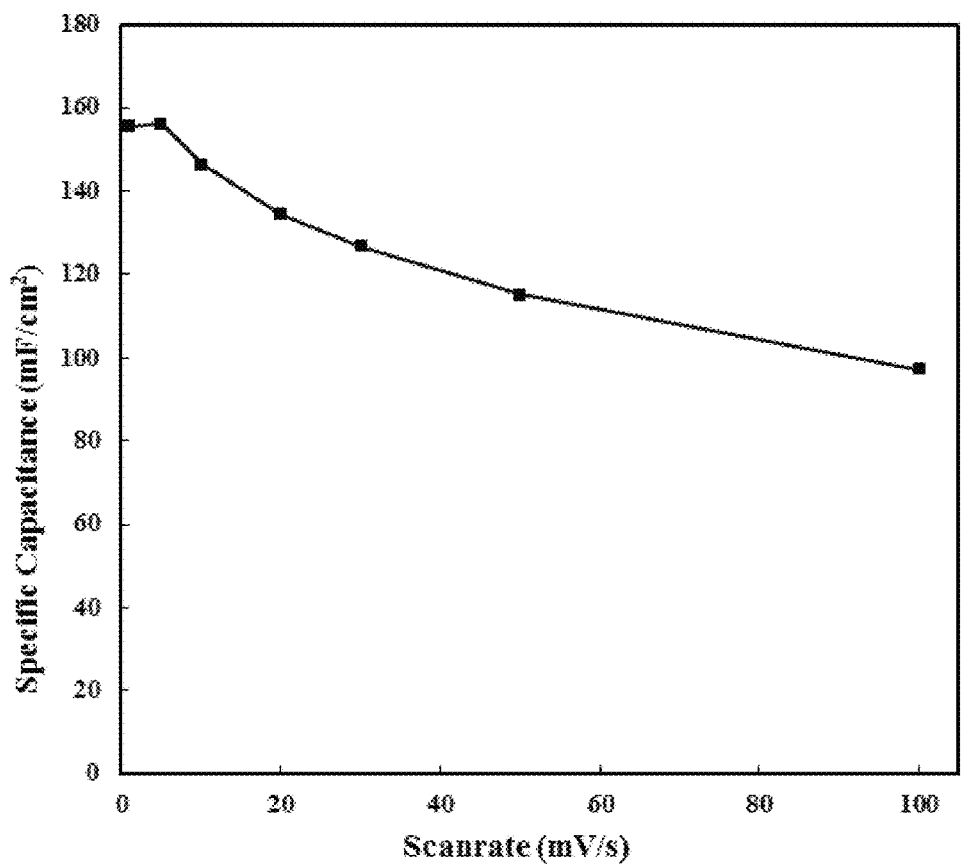
FIG. 32 shows the results of calculation of specific capacitance per area based on the results of specific capacitance of FIG. 31.
Figure 33:
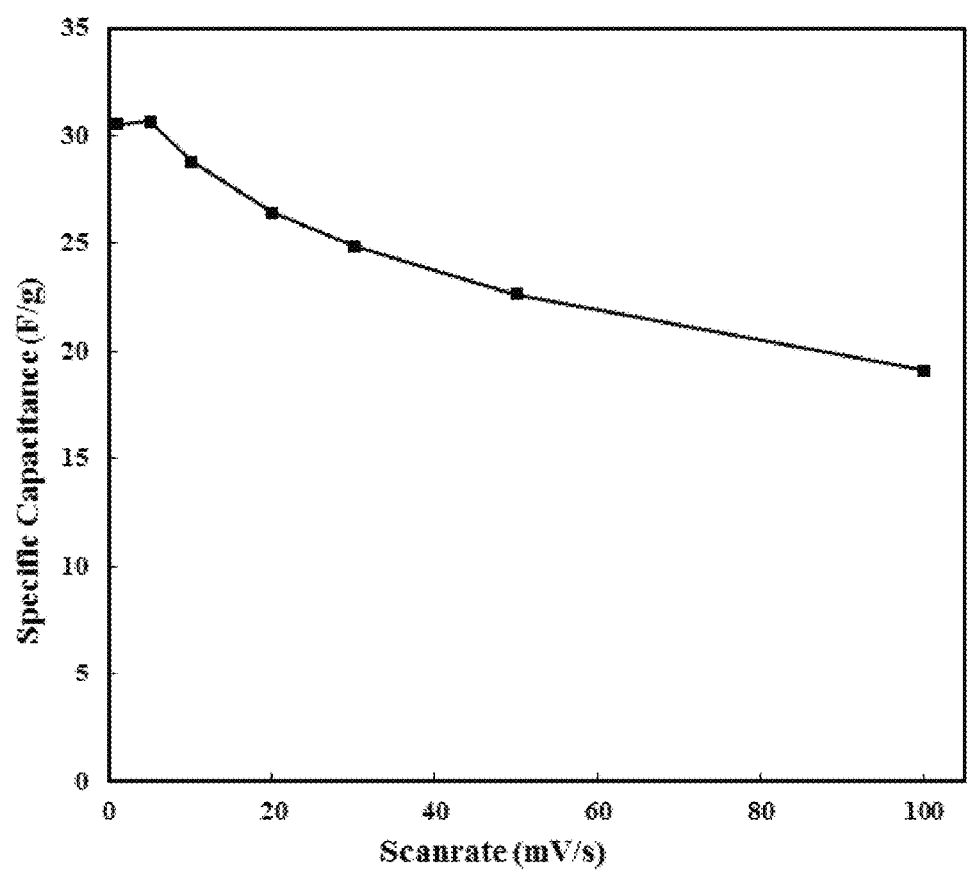
FIG. 33 shows the results of calculation of specific capacitance per total electrode weight based on the results of specific capacitance of FIG. 31.
Figure 34:
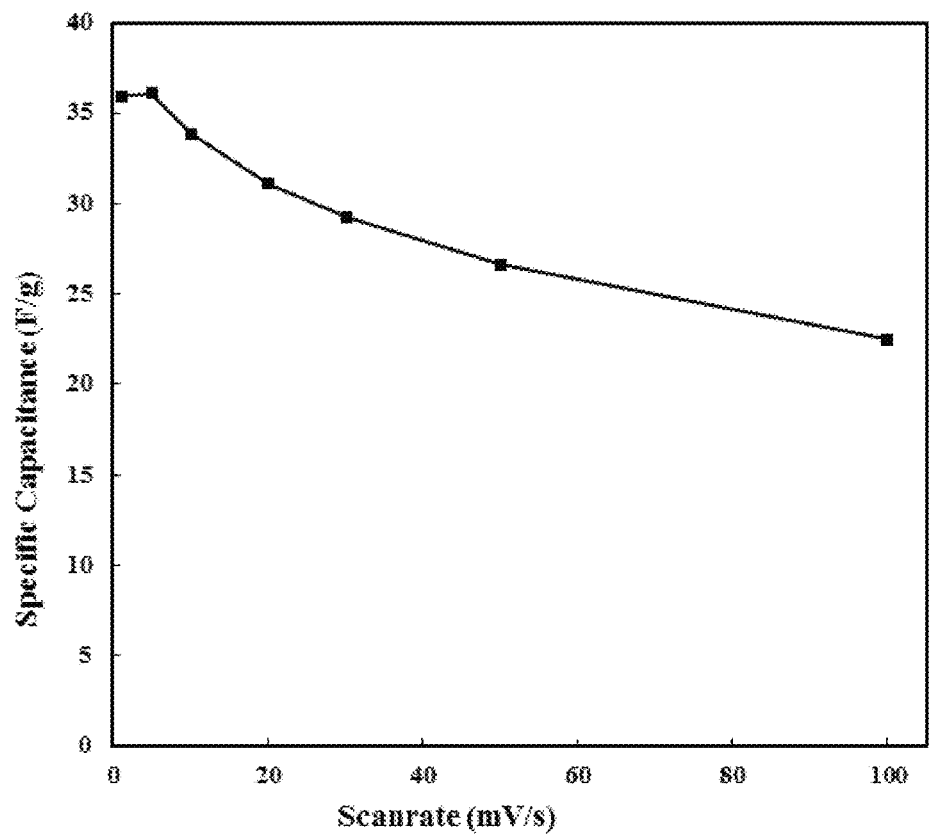
FIG. 34 shows the results of calculation of specific capacitance per weight of the electrode active material based on the results of specific capacitance of FIG. 31.

FIG. 32 shows the results of calculation of specific capacitance per area based on the results of specific capacitance of FIG. 31, FIG. 33 shows the results of calculation of specific capacitance per total electrode weight based on the results of specific capacitance of FIG. 31, and FIG. 34 shows the results of calculation of specific capacitance per weight of the electrode active material.

The results of FIG. 32 are obtained from the results of FIG. 31 based on 2.54 cm², corresponding to the area of the electrode applied on the current collector, the results of FIG. 33 are obtained on the basis that the weight of the cathode is 6.5109 mg and the weight of the anode is 6.4202 mg, and the results of FIG. 34 are obtained using 85 wt % of the active material contained in the electrode.

Figure 35:
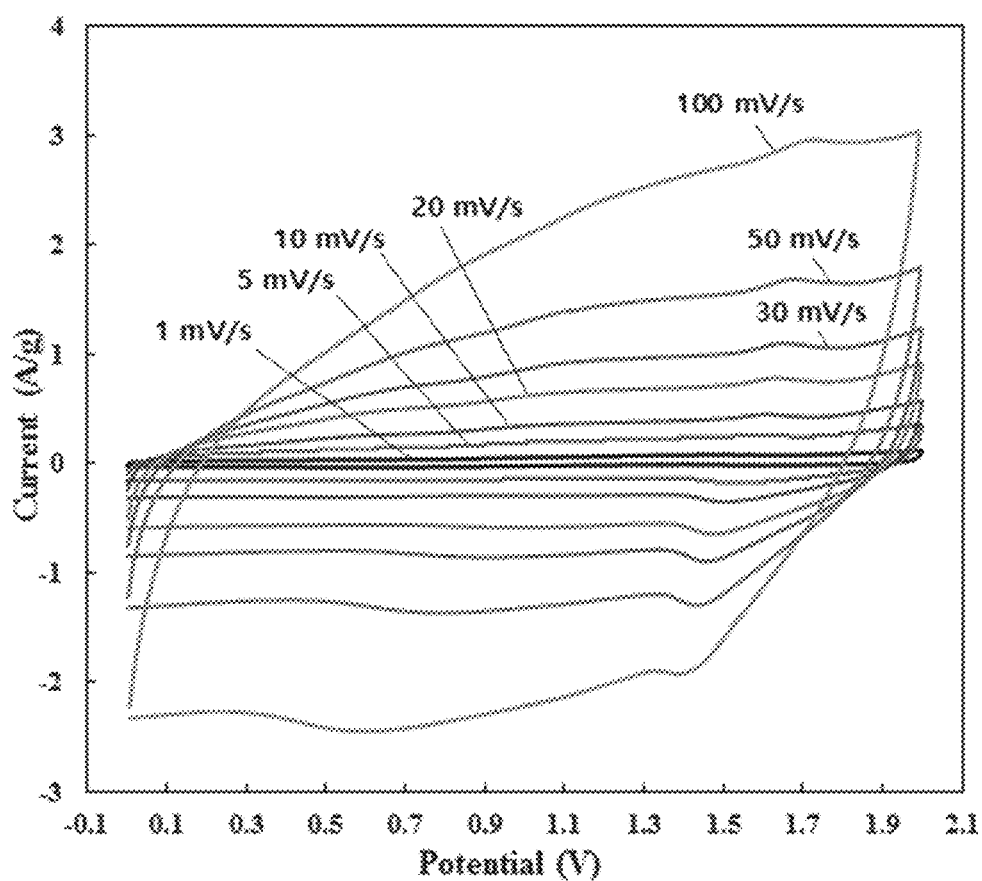
FIG. 35 shows the cyclic voltammograms measured depending on changes in the scan rate in the aluminum ion capacitor of Example 3.
Figure 36:
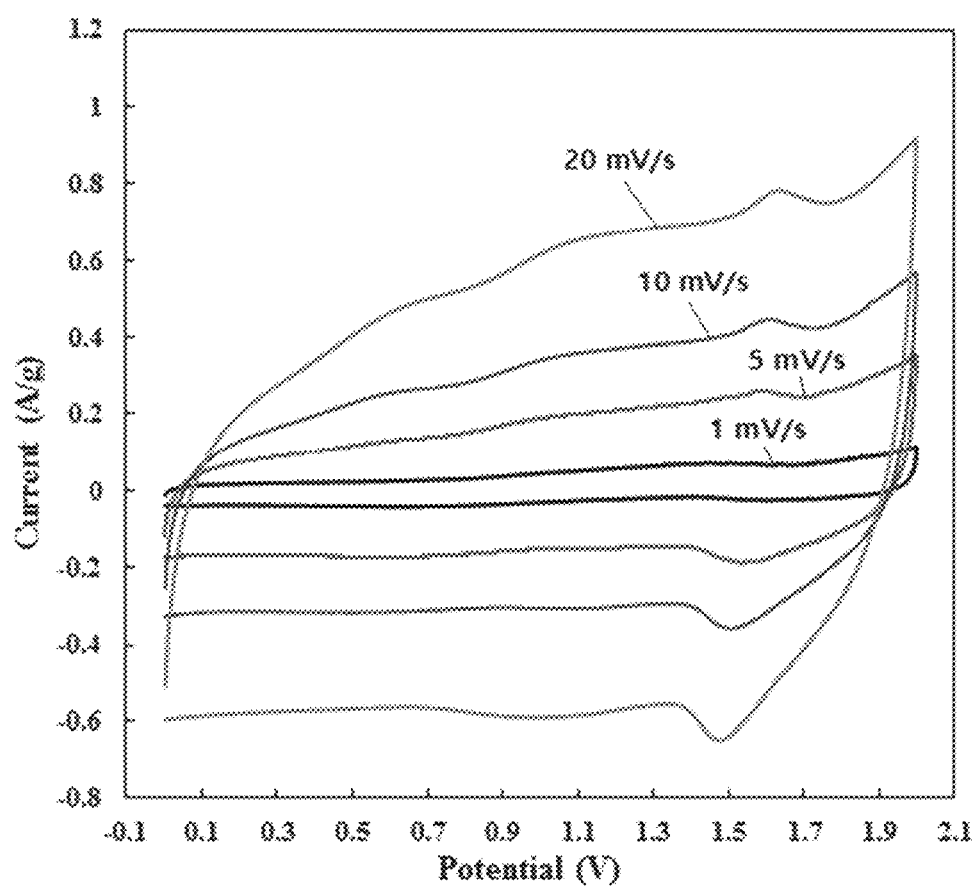
FIG. 36 is an expanded graph showing some of the results of FIG. 35.

FIG. 35 shows the cyclic voltammograms measured depending on changes in the scan rate in the aluminum ion capacitor of Example 3, and FIG. 36 is an expanded graph showing some of the results thereof.

The voltammograms were measured under the condition that the voltage was changed up to 2 V and the scan rate was changed in the range of 1 to 100 mV/S. FIG. 36 is an expanded graph when the scan rate ranges from 1 to 20 mV/S. As described above, the CV curve of a supercapacitor is illustrated, and the area of the closed curve is enlarged with an increase in scan rate.

EXAMPLE 4

The aluminum ion capacitor of Example 4 is configured such that an active material responsible for intercalation and deintercalation of aluminum is applied to an anode, in addition to aluminum, as in Example 3.

A cathode was formed as in Example 1 by applying a slurry, comprising 85 wt % of YP50FH activated carbon, 7 wt % of super-P, 3 wt % of carboxymethyl cellulose (CMC) and 5 wt % of styrene-butadiene rubber (SBR), to an area of 2.54 $cm^2$ on a current collector made of gold.

An electrolyte, obtained by dissolving $AlCl_3$ in an ionic liquid [EMIM]Cl as in the above Examples, was used, and the ratio of $AlCl_3$:[EMIM]Cl was adjusted to 1.8:1.

An anode was formed by doping graphite with aluminum so as to enable intercalation and deintercalation of aluminum. Specifically, in the electrolyte, HOPG (Highly Ordered Pyrolytic Graphite) and aluminum foil were interconnected with each other so that HOPG was pre-doped with Al, whereby HOPG, enabling intercalation and deintercalation of aluminum through pre-doping with Al, was used as the anode.

The electrochemical properties of the aluminum ion capacitor of Example 4 thus configured were measured.

Figure 37:
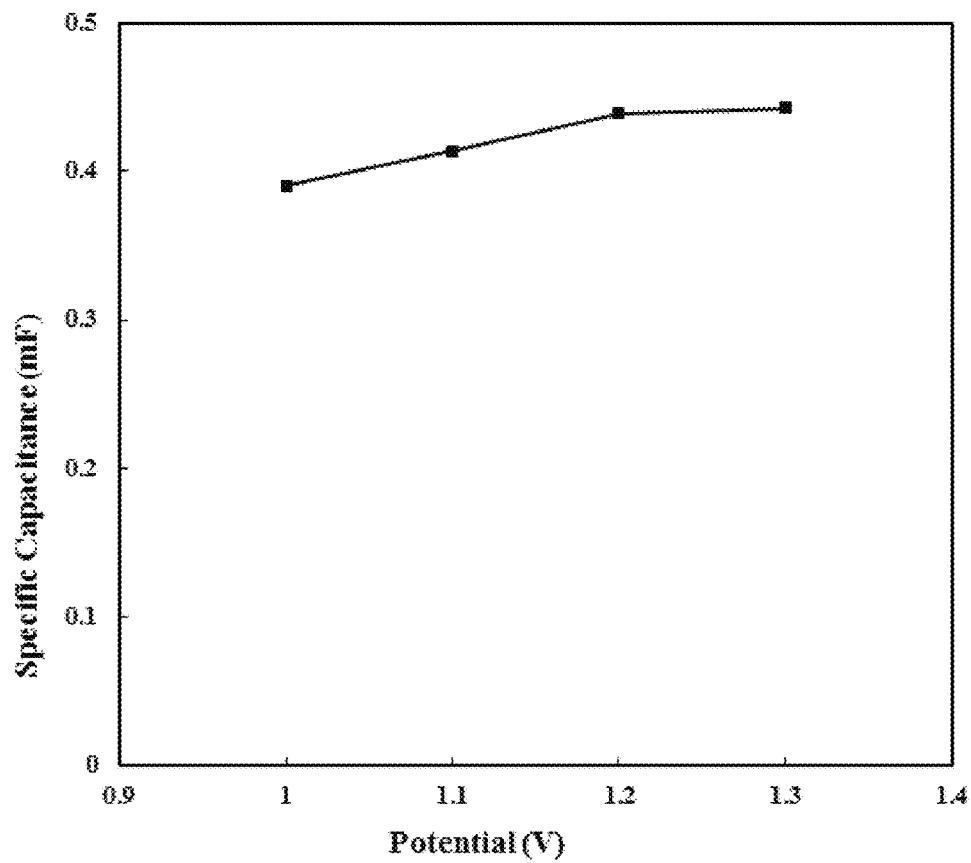
FIG. 37 shows the results of measurement of capacitance depending on the potential window in the aluminum ion capacitor of Example 4.

FIG. 37 shows the results of measurement of capacitance depending on the potential window in the aluminum ion capacitor of Example 4.

The specific capacitance of the aluminum ion capacitor was measured at different potentials, and the scan rate was 10 mV/S. The aluminum ion capacitor of Example 4 was gradually increased in specific capacitance with an increase in potential.

Figure 38:
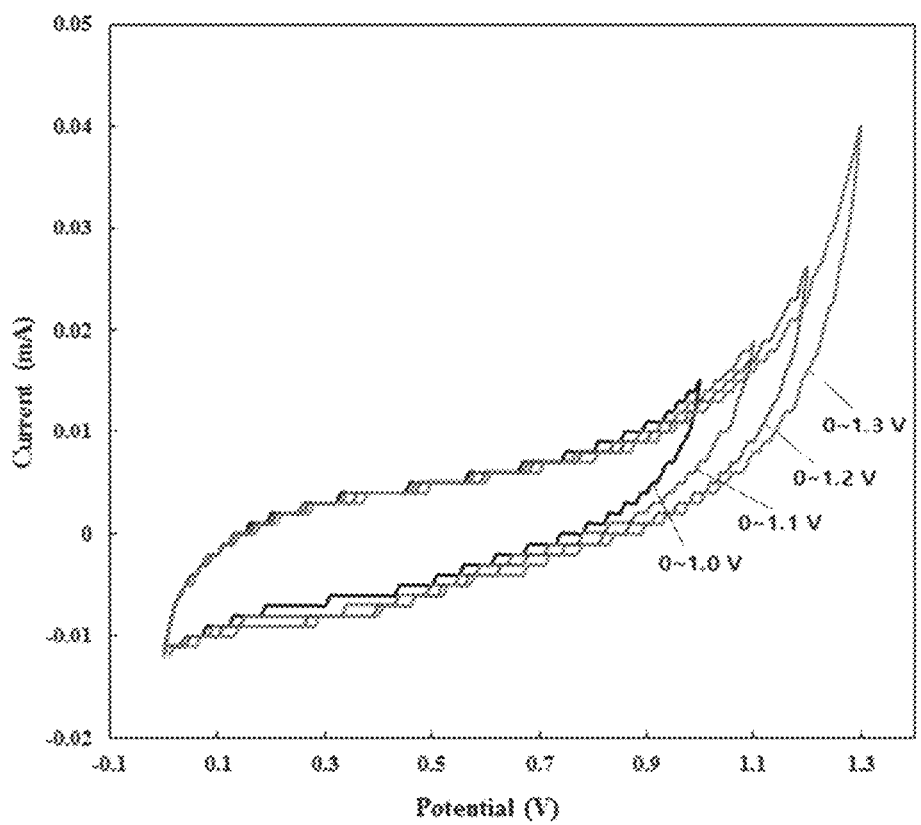
FIG. 38 shows the cyclic voltammograms measured depending on changes in applied potential in the aluminum ion capacitor of Example 4.

FIG. 38 shows the cyclic voltammograms measured depending on changes in applied potential in the aluminum ion capacitor of Example 4.

These cyclic voltammograms illustrate the shape of a typical CV curve of a supercapacitor. As the applied potential was increased, the area of the closed curve was enlarged, indicative of increased specific capacitance. Hence, these results matched the aforementioned results of measurement of specific capacitance.

In Examples 3 and 4, the aluminum ion capacitor could be manufactured by forming the anode using an active material responsible for intercalation and deintercalation of aluminum, in addition to aluminum.

As described above, the aluminum ion capacitors of Examples of the invention can be found to have specific capacitance per area and specific capacitance per weight sufficient for use as an energy storage device, despite the formation of an anode having a simple structure using inexpensive aluminum, unlike the conventional lithium ion capacitor.

This is considered to be because the aluminum anode in foil form is usable due to the stability of the aluminum material and because two or three electrons may be obtained from the aluminum ions, thereby increasing the energy density. Furthermore, no limitations are imposed on the structure of the aluminum anode, thus making it possible to sufficiently increase the power density.

Therefore, the aluminum ion capacitor according to the present invention is inexpensive and has a long cycle life and high energy density, and may thus be utilized as an energy storage source of an energy storage system (ESS), or as an ultra-compact supplementary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should be interpreted not by specific embodiments but by the accompanying claims, and it is to be understood that all technical ideas within the claims fall within the purview of the present invention.

What is claimed is:

1. An aluminum ion capacitor, comprising:
    a separator;
    a cathode and an anode, between which the separator is interposed; and
    an electrolyte, which contacts the cathode and the anode,
    wherein the anode comprises aluminum as an anode active material,
    the electrolyte includes an aluminum ion, and
    an electrical double layer is formed at only the cathode among the cathode and the anode and intercalation and deintercalation of the aluminum ion are performed at the anode.

2. The aluminum ion capacitor of claim 1, wherein the anode is an aluminum foil.

3. The aluminum ion capacitor of claim 1, wherein the anode is any one selected from among aluminum foam, an aluminum powder, and shell particles having an aluminum coating layer.

4. The aluminum ion capacitor of claim 1, wherein the cathode includes porous carbon as a cathode active material.

5. The aluminum ion capacitor of claim 4, wherein the porous carbon is any one selected from among activated carbon, carbon nanotubes, and graphene.

6. The aluminum ion capacitor of claim 1, wherein the cathode includes, as a cathode active material, any one selected from among an oxide, a sulfide, a nitride, and a conductive polymer.

7. The aluminum ion capacitor of claim 1, wherein the cathode includes a current collector attached thereto.

8. The aluminum ion capacitor of claim 1, wherein the anode includes a current collector attached thereto.

9. The aluminum ion capacitor of claim 1, wherein the aluminum ion capacitor is used as an energy storage source of an energy storage system.

10. The aluminum ion capacitor of claim 1, wherein the aluminum ion capacitor is used as an ultra-compact supplementary battery.

11. An aluminum ion capacitor, comprising:
    a separator;
    a cathode and an anode, between which the separator is interposed; and
    an electrolyte, which contacts the cathode and the anode,
    wherein the electrolyte includes an aluminum ion,
    the anode comprises a material that enables intercalation and deintercalation of the aluminum ion, as an anode active material, and
    an electrical double layer is formed at only the cathode among the cathode and the anode and intercalation and deintercalation of the aluminum ion are performed at the anode.

* * * * *